(12) United States Patent
McElroy

(10) Patent No.: US 10,681,421 B2
(45) Date of Patent: Jun. 9, 2020

(54) PERSONALIZED, EVENT-DRIVEN, AND LOCATION-BASED CONSUMPTION OF MEDIA CONTENT

(71) Applicant: Turner Broadcasting System, Inc., Atlanta, GA (US)

(72) Inventor: Matt McElroy, Cumming, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 15/838,882

(22) Filed: Dec. 12, 2017

(65) Prior Publication Data

US 2018/0192144 A1 Jul. 5, 2018

Related U.S. Application Data

(60) Provisional application No. 62/441,693, filed on Jan. 3, 2017.

(51) Int. Cl.
*H04N 21/472* (2011.01)
*H04N 21/2187* (2011.01)
(Continued)

(52) U.S. Cl.
CPC ..... *H04N 21/47214* (2013.01); *G06F 16/435* (2019.01); *G06F 16/48* (2019.01);
(Continued)

(58) Field of Classification Search
None
See application file for complete search history.

(56) References Cited

U.S. PATENT DOCUMENTS 7,383,563 B1   6/2008  Rashkovskiy
8,577,315 B2   11/2013 Anzures et al.
(Continued)

OTHER PUBLICATIONS

Fanatic Sports Application, "App helps traveling sports fans find spots to watch teams," Reiss, Dawn, published in USA Today on Dec. 1, 2013, 2 pages, retrieved from https://www.usatoday.ocm/story/travel/destinations/2013/12/01/fanatic-sports-app-locates-sports-bars-with-fans/3576455/ on Mar. 9, 2018.
(Continued)

*Primary Examiner* — Jason K Lin
(74) *Attorney, Agent, or Firm* — Alston & Bird LLP

(57) ABSTRACT

A personalized, location-based experience of consuming a media event is provided. A user computing entity comprising a processor, memory, network interface configured to communicate via at least one network, and location sensor identifies a media event that a user is expected to want to consume. The user computing entity determines a current location of the user computing entity. The user computing entity identifies a stream providing audio and/or video data corresponding to the media event available at the current location based at least in part on (a) event information corresponding to the media event and (b) the current location. The user computing entity identifies an audio/video device located within close proximity of the user computing entity; and provides a communication comprising a command to the audio/video device. The processing of the communication by the audio/video device causes the audio/video device to provide audio and/or video data of the stream.

20 Claims, 12 Drawing Sheets

(51) Int. Cl.

| | | |
|---|---|---|
| *H04N 21/258* | (2011.01) | |
| *H04N 21/442* | (2011.01) | |
| *H04W 4/80* | (2018.01) | |
| *G06F 16/48* | (2019.01) | |
| *G06F 16/435* | (2019.01) | |
| *G06F 16/9535* | (2019.01) | |
| *H04L 29/08* | (2006.01) | |
| *H04W 4/02* | (2018.01) | |
| *H04L 29/06* | (2006.01) | |
| *H04N 21/845* | (2011.01) | |
| *H04N 21/45* | (2011.01) | |
| *H04N 21/84* | (2011.01) | |
| *H04N 21/488* | (2011.01) | |
| *H04N 21/41* | (2011.01) | |
| *H04M 1/725* | (2006.01) | |

(52) U.S. Cl.
CPC ...... *G06F 16/9535* (2019.01); *H04L 65/4092* (2013.01); *H04L 67/00* (2013.01); *H04L 67/18* (2013.01); *H04L 67/26* (2013.01); *H04L 67/289* (2013.01); *H04M 1/72563* (2013.01); *H04N 21/2187* (2013.01); *H04N 21/25841* (2013.01); *H04N 21/4126* (2013.01); *H04N 21/44213* (2013.01); *H04N 21/4524* (2013.01); *H04N 21/4532* (2013.01); *H04N 21/4882* (2013.01); *H04N 21/84* (2013.01); *H04N 21/8455* (2013.01); *H04N 21/8456* (2013.01); *H04W 4/023* (2013.01); *H04W 4/80* (2018.02); *H04L 65/601* (2013.01); *H04L 67/306* (2013.01)

(56) References Cited

U.S. PATENT DOCUMENTS

| | | | |
|---|---|---|---|
| 8,634,944 B2 | 1/2014 | Bull et al. | |
| 8,819,737 B2 | 8/2014 | Beattie, Jr. et al. | |
| 8,854,555 B2 | 10/2014 | Adderly et al. | |
| 9,021,518 B2 | 4/2015 | Theriault | |
| 9,094,730 B1* | 7/2015 | Kirmse | H04N 21/4826 |
| 2004/0019899 A1* | 1/2004 | Pelletier | H04N 5/782 725/10 |
| 2005/0091689 A1* | 4/2005 | Lee | H04H 20/26 725/62 |
| 2005/0094610 A1* | 5/2005 | de Clerq | G05B 15/02 370/338 |
| 2007/0250445 A1 | 10/2007 | Ache | |
| 2008/0064412 A1 | 3/2008 | Huang | |
| 2009/0064221 A1 | 3/2009 | Stevens | |
| 2009/0124264 A1 | 5/2009 | Su | |
| 2009/0143067 A1* | 6/2009 | Kim | H04N 5/44 455/434 |
| 2009/0146779 A1* | 6/2009 | Kumar | G06K 9/00885 340/5.31 |
| 2009/0176574 A1* | 7/2009 | Lamb | H04N 21/435 463/40 |
| 2010/0333032 A1* | 12/2010 | Lau | H04N 5/4403 715/835 |
| 2013/0035086 A1* | 2/2013 | Chardon | H04N 21/00 455/420 |
| 2013/0104170 A1 | 4/2013 | Su | |
| 2013/0111511 A1 | 5/2013 | Besehanic | |
| 2014/0181867 A1* | 6/2014 | Strachota | H04H 20/10 725/39 |
| 2015/0058888 A1* | 2/2015 | Cho | G08C 17/02 725/38 |
| 2015/0229864 A1 | 8/2015 | Wang et al. | |
| 2015/0350590 A1* | 12/2015 | Micewicz | H04N 21/42201 386/230 |
| 2016/0029085 A1 | 1/2016 | Mountain | |
| 2016/0105706 A1* | 4/2016 | Wei | H04N 21/4126 725/12 |
| 2016/0105718 A1* | 4/2016 | Xu | H04N 21/25841 725/25 |
| 2016/0150282 A1* | 5/2016 | Hirabayashi | H04N 21/4222 725/33 |
| 2016/0259616 A1* | 9/2016 | Hosein | H04M 1/72519 |
| 2017/0147677 A1* | 5/2017 | Zhang | G06F 17/30241 |
| 2017/0188098 A1 | 6/2017 | Lin | |

OTHER PUBLICATIONS

Fanatic Sports Application for Android, available for download at https://play.google.com/store/apps/details/?id=com.fanatic.android &hl=en, updated Aug. 9, 2014, 3 pages.

NFL RedZone from NFL Network, *mydish*, Mar. 4, 2015 to Nov. 10, 2016, Internet Archive <https://web.archive.org/web/*/https://www.mydish.com/upgrades/redzone>, 7 pages.

Skipr.tv, LLC, "Tired of TV Commercials? Stop watching them! Skipr removes commercial from live and recorded television" copyright 2017, retrieved from <http://skipr.tv> on Mar. 9, 2018, 6 pages.

United States Patent and Trademark Office, Office Action for U.S. Appl. No. 15/838,976, dated Aug. 15, 2018, 18 pages, U.S.A.

United States Patent and Trademark Office, Office Action for U.S. Appl. No. 15/838,976, dated Jan. 30, 2019, 17 pages, U.S.A.

United States Patent and Trademark Office, Office Action for U.S. Appl. No. 15/838,976, dated Jul. 3, 2019, 14 pages, U.S.A.

United States Patent and Trademark Office, Notice of Allowance for U.S. Appl. No. 15/838,976, dated Oct. 22, 2019, (11 pages), U.S.A.

* cited by examiner

PERSONALIZED, EVENT-DRIVEN, AND LOCATION-BASED CONSUMPTION OF MEDIA CONTENT

CROSS-REFERENCE TO RELATED APPLICATIONS

This application claims priority to U.S. Provisional Application No. 62/441,693, filed Jan. 3, 2017, the content of which is hereby incorporated by reference herein in its entirety.

TECHNOLOGICAL FIELD

Embodiments of the present invention are generally related to providing a user with a personalized and/or location-based experience of consuming media content. For example, an example embodiment provides a user with a personalized and/or location-based experience of consuming a media event such as a sporting event.

BACKGROUND

The majority of users receive and experience media events via live linear broadcast television, live streaming services, live broadcast radio, and/or other non-personalized media sources. For example, multiple media events may occur at the same time that may be of interest to a user. However, the user may not be able to monitor all of the media events at the same time to determine which media event is more interesting at that moment and should therefore command the user's attention. In another example, a user may not be in the same location throughout the entirety of a media event. For example, the user may be listening to an audio stream related to a media event in his or her car and then arrive home and enter his or her house. During the time between when the user's car radio turns off and the time the user can access a video media stream on his or her television or other audio/video device, the user may miss a significant part of the media event. In another example, a user may not be aware that an appointment or activity the user is scheduled to attend or participate in overlaps with a media event the user would like to watch. The user may then miss the event and not know ahead of time to schedule a recording of the event.

Therefore, a need exists for improved methods, apparatus, systems, computer program products, computing devices, computing entities, and/or the like for providing a user with a personalized, event-driven, and/or location-based experience of consuming media events.

BRIEF SUMMARY

In general, embodiments of the present invention provide methods, apparatus, systems, computer program products, computing devices, computing entities, and/or the like for producing and providing one or more users with a personalized and/or location-based experience of consuming media events, such as sporting events. In an example embodiment, a user computing entity may be carried by a user from a first location to a second location. The user computing entity may cause a television, radio, or other audio/video device to turn on and/or be tuned to a channel or other audio/video stream providing a media event that it is expected the user wants to consume. In an example embodiment, a user computing entity may determine that a user is going to be away from home when a media event the user is expected to want to consume is being aired. The user computing entity may determine and provide the user with information regarding how the user may consume the media event at the location where the user will be located during the media event.

According to an aspect of the present invention, a method for providing personalized, location-based consumption of a media event is provided. In an example embodiment, the method comprises identifying, by a user computing entity a media event that a user is expected to want to consume. In an example embodiment, the user computing entity comprises a processor, a memory, a network interface configured to communicate via at least one network, and a location sensor. In an example embodiment, the method further comprises determining, by the user computing entity, a current location of the user computing entity; and identifying, by the user computing entity and based at least in part on (a) event information corresponding to the media event and (b) the current location, a stream providing audio and/or video data corresponding to the media event available at the current location. In an example embodiment, the method further comprises identifying, by the user computing entity, an audio/video device located within close proximity of the user computing entity; and providing a communication comprising a command to the audio/video device, wherein the processing of the communication by the audio/video device causes the audio/video device to provide audio and/or video data of the stream.

According to another aspect of the present invention, an apparatus is provided. In an example embodiment, the apparatus comprises at least one processor, at least one memory storing computer program code, a network interface configured to communicate via at least one network, and a location sensor. The at least one memory and the computer program code configured to, with the processor, cause the apparatus to at least identify a media event that a user is expected to want to consume; cause the location sensor to determine a current location of the apparatus; identify, based at least in part on (a) event information corresponding to the media event and (b) the current location, a stream providing audio and/or video data corresponding to the media event available at the current location; identify an audio/video device located within close proximity of the apparatus; and cause the network interface or an antenna of the apparatus to provide a communication comprising a command to the audio/video device. The processing of the communication by the audio/video device causes the audio/video device to provide audio and/or video data of the stream.

According to yet another aspect of the present invention, a computer program product is provided. In an example embodiment, the computer program product comprises at least one non-transitory computer-readable storage medium having computer-executable program code instructions stored therein. The computer-executable program code instructions comprise program code instructions. Execution of the program code instructions by a processor of an apparatus causes the apparatus to at least identify a media event that a user is expected to want to consume; cause a location sensor of the apparatus to determine a current location of the apparatus; identify, based at least in part on (a) event information corresponding to the media event and (b) the current location, a stream providing audio and/or video data corresponding to the media event available at the current location; identify an audio/video device located within close proximity of the apparatus; and cause a network interface or an antenna of the apparatus to provide or transmit a communication comprising a command to the audio/video device, wherein the processing of the communication by the audio/video device causes the audio/video device to provide audio and/or video data of the stream.

According to still another aspect of the present invention, a method for providing personalized, location-based consumption of a media event. In an example embodiment, the method comprises identifying, by a user computing entity, a media event that a user is expected to want to consume based on profile information corresponding to the user. In an example embodiment, the user computing entity comprises a processor, a memory, a network interface configured to communicate via at least one network, and a location sensor. In an example embodiment, the method further comprises executing, by the user computing entity, an application programming interface by a client module to access calendar information corresponding to the user. The calendar information corresponds to a time of the media event. In an example embodiment, the method further comprises, responsive to determining, by the user computing entity and based on event information corresponding to the media event and the calendar information, a conflict exists between an instance of the calendar information and the media event, identifying location information corresponding to the instance of calendar information. In an example embodiment, the method further comprises identifying, by the user computing entity and based at least in part on (a) the event information and (b) the location information, a stream providing audio and/or video data corresponding to the media event available at a location indicated by the location information; and providing a user perceivable notification, via the user computing entity and based on the profile information, information regarding the conflict and information regarding how the user may access the stream.

According to another aspect of the present invention, an apparatus is provided. In an example embodiment, the apparatus comprises at least one processor, at least one memory storing computer program code, a network interface configured to communicate via at least one network, and a location sensor. The at least one memory and the computer program code configured to, with the processor, cause the apparatus to at least identify a media event that a user is expected to want to consume based on profile information corresponding to the user; execute an application programming interface by a client module to access calendar information corresponding to the user, the calendar information corresponding to a time of the media event; responsive to determining, based on event information corresponding to the media event and the calendar information, a conflict exists between an instance of the calendar information and the media event, identify location information corresponding to the instance of calendar information; identifying based at least in part on (a) the event information and (b) the location information, a stream providing audio and/or video data corresponding to the media event available at a location indicated by the location information; and provide a user perceivable notification, based on the profile information, information regarding the conflict and information regarding how the user may access the stream.

According to yet another aspect of the present invention, a computer program product is provided. In an example embodiment, the computer program product comprises at least one non-transitory computer-readable storage medium having computer-executable program code instructions stored therein. The computer-executable program code instructions comprise program code instructions. Execution of the program code instructions by a processor of an apparatus causes the apparatus to at least identify a media event that a user is expected to want to consume based on profile information corresponding to the user; execute an application programming interface by a client module to access calendar information corresponding to the user, the calendar information corresponding to a time of the media event; responsive to determining, based on event information corresponding to the media event and the calendar information, a conflict exists between an instance of the calendar information and the media event, identify location information corresponding to the instance of calendar information; identify based at least in part on (a) the event information and (b) the location information, a stream providing audio and/or video data corresponding to the media event available at a location indicated by the location information; and provide a user perceivable notification, based on the profile information, information regarding the conflict and information regarding how the user may access the stream.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF VARIOUS EMBODIMENTS

Figure 1:
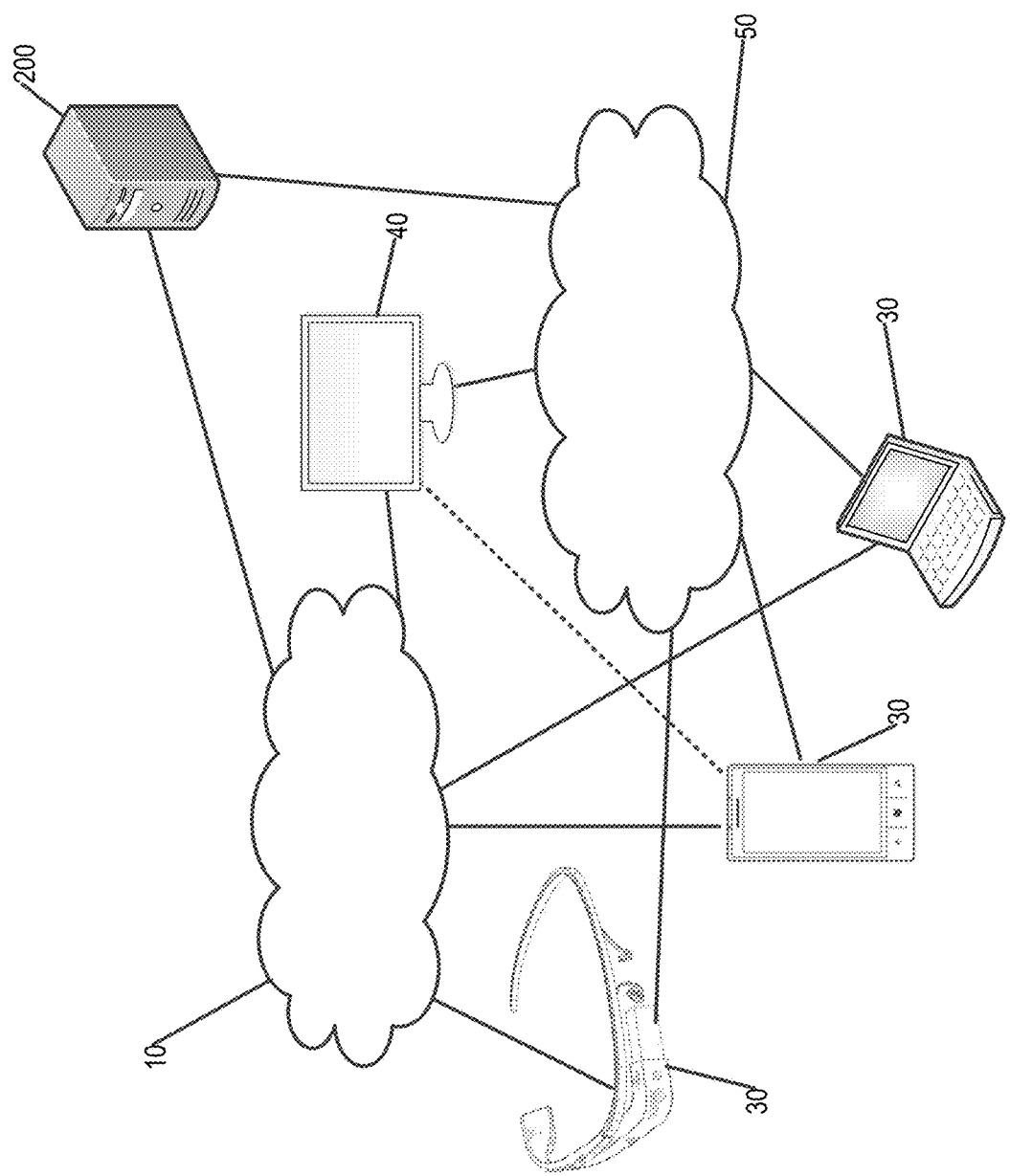
FIG. 1 illustrates one embodiment of a system for producing and providing a user with personalized and/or location-based experience of consuming media events, in accordance with one embodiment the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also denoted as "/") is used herein in both the alternative and conjunctive sense, unless otherwise indicated. The terms "illustrative" and "exemplary" are used to be examples with no indication of quality level. And terms are used both in the singular and plural forms interchangeably. Like numbers refer to like elements throughout.

I. METHODS, APPARATUS, SYSTEMS, AND COMPUTER PROGRAM PRODUCTS

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. GENERAL OVERVIEW

Embodiments of the present invention provide methods, apparatus, systems, computer program products, computing devices, computing entities, and/or the like for providing users with a personalized and/or location-based experience of watching, listening to, viewing, experiencing, consuming, and/or other words used interchangeably herein media events. In an example embodiment, multiple media events and/or multiple streams corresponding to one or more media events may be monitored to determine a real-time or near real-time personalized interest score for each media event and/or each stream corresponding to the one or more media events. In various embodiments, a stream may be any audio and/or video stream configured to provide audio and/or video corresponding to a media event for user consumption via an audio/video device. For example, a stream may be broadcast using an internet-based, over the air, satellite, cable, and/or other content distribution network. The user may be notified if the media event and/or stream with the most interesting/highest interest score changes, is not the media event and/or stream the user is currently consuming via the user's audio/video device, and/or the like. In an example embodiment, the audio/video device (e.g., television, tablet, radio, and/or the like) may be automatically switched to the stream corresponding to the media event and/or stream with the most interesting/highest interest score.

In another example embodiment, the location of the user may be determined and audio/video devices in the vicinity and/or proximity of the user may be identified. If a user is consuming a media event via a first audio/video device and then moves so that the user is closer to a second audio/video device, the second audio/video device may be automatically turned on, tuned to the channel/stream the user was consuming on the first audio/video device, and/or the like. In another example, a user may be consuming a media event using an audio/video device within the user's vehicle (e.g., a standard vehicle radio, a high definition radio, satellite radio, and/or the like) via a first station. When the user approaches the boundary of the broadcast area of the first station, a second station may be identified that is providing coverage of the same media event and for which the user is or is about to be in the broadcast area of. The user may be notified of the second station and/or the audio/video device may be automatically switched to the second station.

In another example, a scheduling conflict between a media event a user would like to consume and an appointment or activity that the user is scheduled to attend/participate in may be identified. For example, the user's electronic calendar may be accessed to identify scheduling conflicts. The user may be provided with information/data regarding how the user may consume the media event at the location where the user will be during the media event. For example, if the user's electronic calendar indicates that the user will be out of town, the user may be provided with a local channel that will be providing the media event, a local bar that is expected to be showing the media event, and/or the like. In another example, the media event may be automatically scheduled to be recorded or the user may be asked if he or she wishes to record the media event for which the user has a scheduling conflict.

In example embodiments, a media event may be a sporting event, concert, performance, television special, live broadcast event, special episode, movie or documentary showing, a video on demand, and/or the like. For example, a media event may be an event for which one or more media streams are available and which is associated with a particular time. In an example embodiment, a media event is an event for which one or more real time, near real time, or live streams are available. As will be recognized, various system architectures that may be used in accordance with the present invention will now be described herein.

III. EXEMPLARY SYSTEM ARCHITECTURE

FIG. 1 illustrates one embodiment of a system that may implement the present invention. In this particular embodiment, the illustrated system may include one or more content distribution/delivery networks (CDNs) 10, one or more user computing entities 30, one or more audio/video devices 40, and one or more provider networks/systems 200. The one or more CDNs 10, the one or more user computing entities 30, and the one or more provider networks/systems 200 may communicate with each other and/or a variety of other computing entities via one or more wired or wireless networks 50. Although described separately, it will be recognized that two or more of the above entities can be combined or included in a single platform.

Content Distribution/Delivery Networks 10

In various embodiments, the one or more CDNs 10 may comprise networks configured for distributing media content. Generally, the term "content," "media," and similar words are used interchangeably to refer to any type of media—audio, videos, datacasts, music, text, images, graphics, articles, photos, photo galleries, video galleries, infographics, maps, polls, guest biographies, tweets or other social media, blog posts, and/or the like. For example, content may include television broadcasts (e.g., live local newscasts), television programs (e.g., The Office), sporting events, movies (e.g., video-on-demand (VOD)), datacasts, music, images, videos, text, webpages, and/or the like. Thus, the CDN 10 may be configured for providing a user with media content via a broadcast, such as via an over-the-air content delivery/distribution network, a linear content delivery/distribution network, a cable content delivery/distribution network, a satellite content delivery/distribution network, an internet-based content delivery/distribution network, and/or the like.

Over-the-Air Content Delivery/Distribution Network

An over-the-air (OTA) CDN 10 can be used in conjunction with embodiments of the present invention. The OTA CDN 10 may be owned and/or operated by a broadcaster (e.g., KCRG, KFXA, KFXB, KGAN, KIIN, KPXR, KRIN, KWKB, KWWF, and/or KWWL) and associated with a broadcast area (e.g., Cedar Rapids-Waterloo-Iowa City-Dubuque broadcast area). Broadcast areas may be designated market areas (DMAs), zip codes, block groups, census tracts, cartographic levels, government-established areas/zones, geographic areas, and/or the like. As will be recognized, a broadcaster may have one or more OTA CDNs 10 depending on the geographic area (e.g., DMA, zip code, block group, census tract, cartographic level, government-established area/zone, geographic area, and/or the like) the broadcast area includes.

An OTA CDN 10 may include various components to transmit/broadcast content and/or data/information via an OTA broadcast (e.g., an OTA broadcast signal) to be received by one or more distribution devices 105. In one embodiment, the OTA CDN 10 may include one or more channel coding elements, one or more modulation elements, and one or more transmitters. Although not shown, the OTA CDN 10 may also include various other components, such as audio subsystems, video subsystems, multiplexers, exciters, drivers, amplifiers, network interfaces, processing elements, and/or the like. Via these elements, for instance, the OTA CDN 10 can transmit/broadcast OTA broadcasts (comprising content and/or data) within a broadcast area. The OTA CDN 10 may transmit/broadcast the broadcast (e.g., OTA broadcast) using a variety of standards and protocols, such as Advanced Television Systems Committee (ATSC), Terrestrial Integrated Services Digital Broadcasting (ISDB-T), Terrestrial Digital Multimedia Broadcasting (T-DMB), Digital Video Broadcasting-Terrestrial (DVB-T), Digital Video Broadcasting-Handheld (DVB-H), Digital Terrestrial Multimedia Broadcast (DTMB), Satellite Terrestrial Interactive Multi-service Infrastructure (STiMi), National Television System Committee (NTSC) standards and protocols, and/or the like.

It will be appreciated that one or more of a CDN's 10 components and other broadcaster components may be located remotely from one another. Furthermore, one or more of the components may be combined and additional components performing functions described herein may be included.

Cable Content Delivery/Distribution Network

Although not shown, a cable CDN 10 (also referred to as a CDN 10) may be used with embodiments of the present invention. A cable CDN 10 may include various components to transmit/broadcast content and/or data/information via the cable provider's CDN 10 to the cable provider's subscribers. For example, in various embodiments, the cable CDN 10 may include a network operations center, a cable modem termination system, and a headend to transmit cable broadcasts (e.g., digital cable signals) through the cable provider's CDN 10 to user computing entities 30. Thus, user computing entities 30 may communicate with a headend over a distribution network.

To perform such functions, the cable CDN 10 may include various components, such as audio subsystems, video subsystems, multiplexers, switches, encoders, satellite receivers and antennae, network interfaces, decoding elements, encoding elements, processing elements, transmitting elements, modulation elements, and/or the like. The cable CDN 10 may be capable of receiving content and/or data/information and/or transmitting content and/or data/information (e.g., transmit broadcast signals in a one-to-many or broadcast configuration) using a variety of standards and protocols to user computing entities 30, including those described with regard to the OTA CDN 10 and/or further including various versions of data/information over cable service interface specification (DOCSIS).

Satellite Content Delivery/Distribution Network

Although not shown, a satellite CDN 10 (also referred to as a CDN 10) may be used with embodiments of the present invention. A satellite CDN 10 may include various components to transmit/broadcast content and/or data/information (e.g., transmit broadcast signals in a one-to-many or broadcast configuration) via the satellite provider's CDN 10 to user computing entities 30 (e.g., subscribers). For example, in various embodiments, the satellite CDN 10 may include uplink facilities (with transmitting antennae), satellites (with transponders), receiving satellite dishes, and/or user computing entities 30. Thus, the satellite CDN 10 can transmit/broadcast satellite broadcasts (comprising content and/or data) to user computing entities 30 using a variety of standards and protocols, such as those described with regard to the OTA CDN 10 and/or further including direct broadcast satellite (DBS), television receive only (TVRO), and/or the like.

Internet-Based Delivery/Distribution Network

Although not shown, an internet-based CDN 10 (also referred to as a CDN 10) may be used with embodiments of the present invention. An internet-based CDN 10 may include various components to transmit/broadcast content and/or data/information (e.g., transmit broadcast signals in a one-to-many or broadcast configuration) via the provider's CDN 10 to user computing entities 30 (e.g., subscribers). Thus, the internet-based CDN 10 can transmit/broadcast broadcasts (comprising content and/or data) to user computing entities 30 using a variety of standards and protocols, such as those described previously.

As described above, CDNs 10 may involve one or more of the above-described types of CDN networks—e.g., OTA networks, satellite networks, cable networks, internet-based networks, other networks, and/or combinations thereof.

Provider System 200

The term "provider" is used to indicate any entity, individual, organization, company, group and/or the like that provides or assists in providing one or more users with at least one media event. The term "user" is used herein to indicate any individual, family, entity, organization, company, group, and/or the like that accesses, receives, views, experiences, listens to, and/or consumes at least one media item provided by the provider. In some embodiments, the user may access, receive, view, experience, listen to and/or consume at least one media event from the provider via a paid or unpaid subscription service for example.

In various embodiments, a provider system 200 may be configured to provide a user (e.g., operating a user computing entity 30 and/or through one or more audio/video devices 40) one or more media events. For example, the provider system may determine an interest score for one or more media events and/or streams associated with one or more media events, provide location-based media event consumption information/data, and/or the like.

In various embodiments, the provider system 200 can be a system operated by, on behalf of, or in association with a media event provider to provide a personalized and/or location-based experience for consuming one or more media events and/or streams corresponding to one or more media events. In general, the terms computing entity, network, network entity, entity, device, system, server, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, wearable items, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data/information, content, information, and/or similar terms used herein interchangeably.

Figure 2:
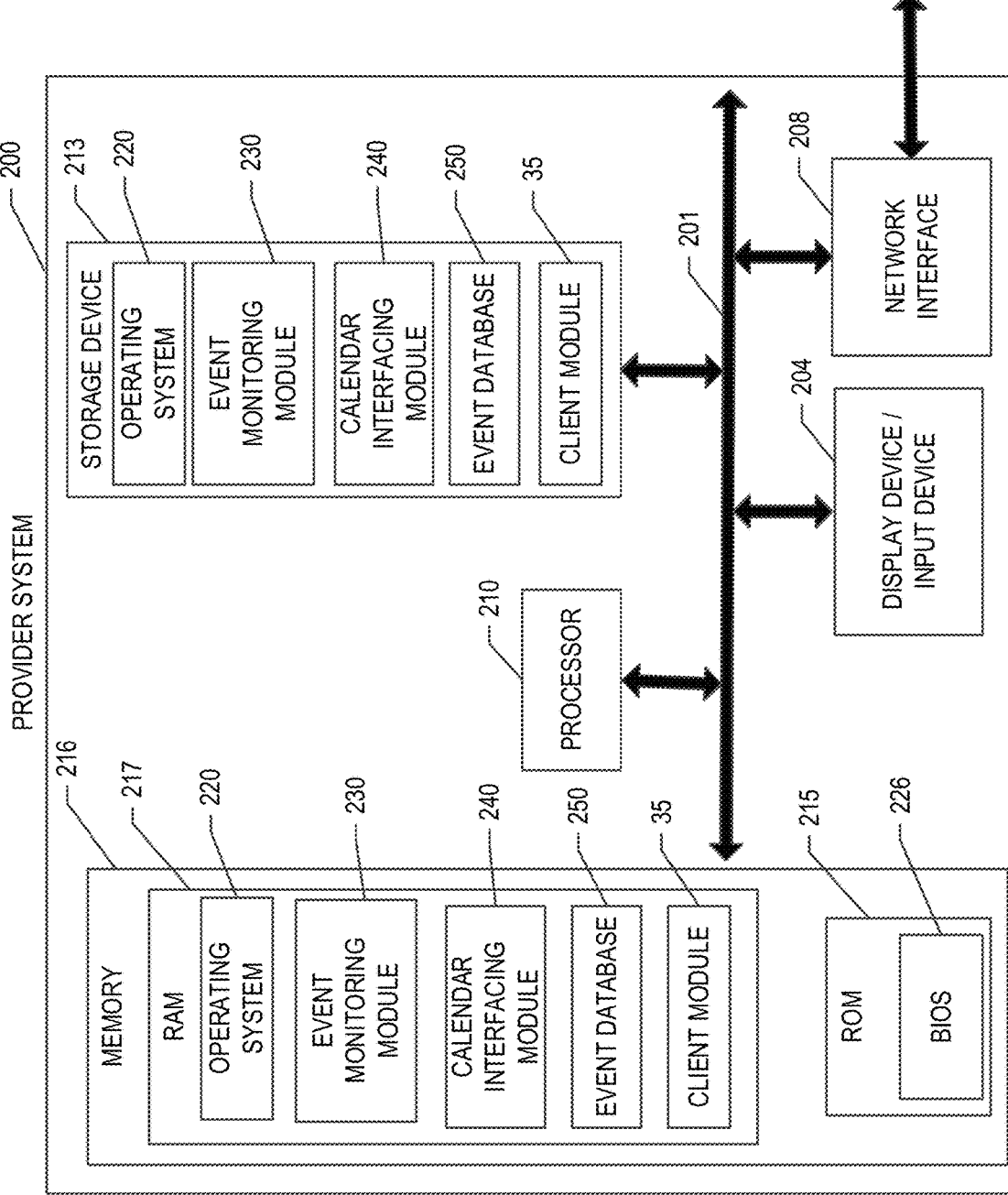
FIG. 2 is a schematic diagram of a provider system, in accordance with an embodiment of the present invention.

FIG. 2 provides a schematic diagram of an example provider system 200. The provider system 200 comprises a processor 210, such as one or more processing elements, which may include complex programmable logic devices (CPLDs), microprocessors, multi-core processors, coprocessing entities, application-specific instruction-set processors (ASIPs), and/or controllers or other processing devices or circuitry. The term circuitry may refer to an entirely hardware embodiment or a combination of hardware and computer program products. Thus, the processor 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 210 may be configured for a particular use or configured to execute instructions stored in volatile or non-volatile media or otherwise accessible to the processor 210. As such, whether configured by hardware or computer program products, or by a combination thereof, the processor 210 may be capable of performing various steps or operations according to embodiments of the present invention, such as the embodiments illustrated in FIGS. 6-12 when configured accordingly. The processor 210 is used to execute software instructions for carrying out the defined steps of the method of the various embodiments of the present invention. The processor 210 communicates using a data/information bus 201 that is used to convey data/information and program instructions, typically, between the processor and memory 216.

The provider system 200 further includes memory 216, which may comprise non-volatile media (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data/information, applications, programs, program modules, scripts, source code, object code, byte code, compiled code, interpreted code, machine code, executable instructions, and/or the like. Such code may include the event monitoring module 230, calendar interfacing module 240, and/or client module 35. The terms database, database instance, database management system, and/or similar terms used herein interchangeably may refer to a structured collection of records or data/information that is stored in a computer-readable storage medium, such as via a relational database, hierarchical database, and/or network database. For example, the event database 250 may be stored in memory 216.

In at least one embodiment, the provider system 200 may further include or be in communication with volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data/information, applications, programs, program modules, scripts, source code, object code, byte code, compiled code, interpreted code, machine code, executable instructions, and/or the like being executed by, for example, the processor 210. Thus, the databases, database instances, database management systems, data/information, applications, programs, program modules, scripts, source code, object code, byte code, compiled code, interpreted code, machine code, executable instructions, and/or the like may be used to control certain aspects of the operation of the provider system 200 with the assistance of the processor 210 and operating system 220, event monitoring module 230, calendar interfacing module 240, client module 35, and/or event database 250.

As indicated, a number of program modules may be stored by the non-volatile (e.g., ROM 215) and/or volatile (e.g., RAM 217) memory. Such program modules may include the event monitoring module 230, calendar interfacing module 240, and/or client module 35. Those skilled in the art will appreciate that other modules may be present in RAM 217 to effectuate the various embodiments of the present invention. Furthermore, rather than described modules, other modules may be used or embodiments may not be modular.

As indicated, in one embodiment, the provider system 200 may also include one or more communications interfaces 208 for communicating with various computing entities, such as by communicating data/information, content, information, and/or similar terms used herein interchangeably that can be transmitted, received, operated on, processed, displayed, stored, and/or the like. For instance, the provider system 200 may be in communication with one or more user computing entities 30 via various wired or wireless network 50. Such communication may be executed using a wired data/information transmission protocol, such as fiber distributed data/information interface (FDDI), digital subscriber line (DSL), Ethernet, asynchronous transfer mode (ATM), frame relay, DOCSIS, Programming Metadata Communication Protocol (PMCP), or any other wired transmission protocol. Similarly, the provider system 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra-wideband (UWB), infrared (IR) protocols, Bluetooth protocols, wireless universal serial bus (USB) protocols, any other wireless protocol, and/or any other appropriate communications protocol. In various embodiments, the provider system 200 may be configured to communicate with various computing entities to provide at least one personalized entertainment network for viewing at least one media presentation to a user computing entity 30.

Various information/data may be input to the provider system 200 via the communications interface 208 and/or input/output device 204. This input information/data may include information/data related to a media item, user feedback regarding a particular media item or class of media item, metadata or other data/information associated with a media item, data/information associated with one or more users, or other information. This input information/data may vary, however, depending on the configuration and informational requirements of the provider system 200.

As mentioned above, the provider system 200 also includes an input/output device 204 for receiving and displaying data/information. The provider system 200 may include or be in communication with one or more input elements, such as a keyboard input, a mouse input, a touch screen/display input, audio input, pointing device input, joystick input, keypad input, and/or the like, as indicated by input/output device 204. The provider system 200 may also include or be in communication with one or more output elements, as indicated by input/output device 204, such as audio output, video output, screen/display output, motion output, movement output, and/or the like.

The provider system 200 may be configured to facilitate production of and provide users with an interest score for one or more media events or streams corresponding to one or more media events, location-based media event consumption information/data, provide media event information/data, and/or the like. The provider system 200 may further be configured to receive and store profile information/data for each of one or more users and apply the profile information/data to determine an interest score for one or more media events and/or media event streams corresponding to one or more media events, provide location-based media event consumption information/data and/or the like. The provider system 200 may be further configured to complete processes related to producing the media event and/or the like.

Those skilled in the art will recognize that many other alternatives and architectures are possible and can be used to practice various embodiments of the invention. The embodiment illustrated in FIG. 2 can be modified in different ways or incorporated within a network and be within the scope of the invention. For example, one or more components of the provider system 200 may be located remotely from other provider system 200 components, such as in a distributed system. Furthermore, one or more of the components may be combined and additional components performing functions described herein may be included in the provider system 200. Thus, the provider system 200 can be adapted to accommodate a variety of needs and circumstances.

User Computing Entity 30

In various embodiments, the user computing entity 30 may be configured to provide a user interface for receiving profile information/data, provide a user with one or more notifications related to one or more media events and/or streams corresponding to one or more media events (e.g., comprising media event information/data, location-based media event consumption information/data, and/or the like), determine a location of user, and/or cause an audio/video device 40 to automatically turn on, provide a particular media channel/stream, and/or the like. For example, as described above, a user computing entity 30 may be one or more computers, mobile phones, gaming consoles (e.g., Xbox, Play Station, Wii), desktops, Rokus, Apple TVs, Chromecasts, tablets, notebooks, phablets, set-top devices in communication with a television or other audio/video device (e.g., projector and/or the like), smart televisions, laptops, wearable computer (e.g., smart watch, heads up device, and/or the like), and/or any combination of devices or entities adapted to perform the functions, operations, and/or processes described herein. In one embodiment, the user computing entity 30 may comprise a combination of two or more computing devices noted above and/or other computing devices. For example, a user computing entity 30 may comprise a set top box "paired" with a tablet. In an example embodiment, the user computing entity 30 is a mobile computing entity/device.

In one embodiment, the user computing entity 30 may include one or more components that are functionally similar to those of the provider system 200. In one embodiment, the user computing entity 30 may include one or more processing elements, one or more audio/video device/input devices, volatile and non-volatile storage or memory, and/or one or more communications interfaces. The user computing entity 30 may also comprise various other systems. In particular, the user computing entity 30 may include components configured to receive an interest score for one or more media streams (e.g., from a provider system 200), determine a user location, receive and/or provide one or more notifications, communicate with one or more audio/video devices 40, and/or the like. For example, the user computing entity 30 may be configured to provide a communication (e.g., via a short range, medium range, or long range communication technology) to an audio/video device 40. For example, the user computing entity 30 may be configured to communicate with an audio/video device 40 via a local Wi-Fi network, Bluetooth, an infrared or radio communication protocol, and/or the like. The user computing entity 30 may also be in communication with a variety of computing entities.

In various embodiments, the user computing entity 30 may include or otherwise be in communication with a variety of input devices that may be configured to receive input from a user such that a user may provide profile information/data that may be used for providing a personalize and/or location-based experience of consuming one or more media events. For example, in some embodiments, the user computing entity 30 may include or be in communication with a pointing device such as a computer mouse, infrared pointing device, motion detecting device, and/or the like. In other embodiments, the user computing entity 30 may include or be in communication with a joy stick, remote control, handheld controller which may include a d-pad, and/or the like. In an example embodiment, the user computing entity 30 comprises a touch screen. Thus, the user computing entity 30 may be configured to receive user input through a variety of input approaches and techniques.

Figure 3:
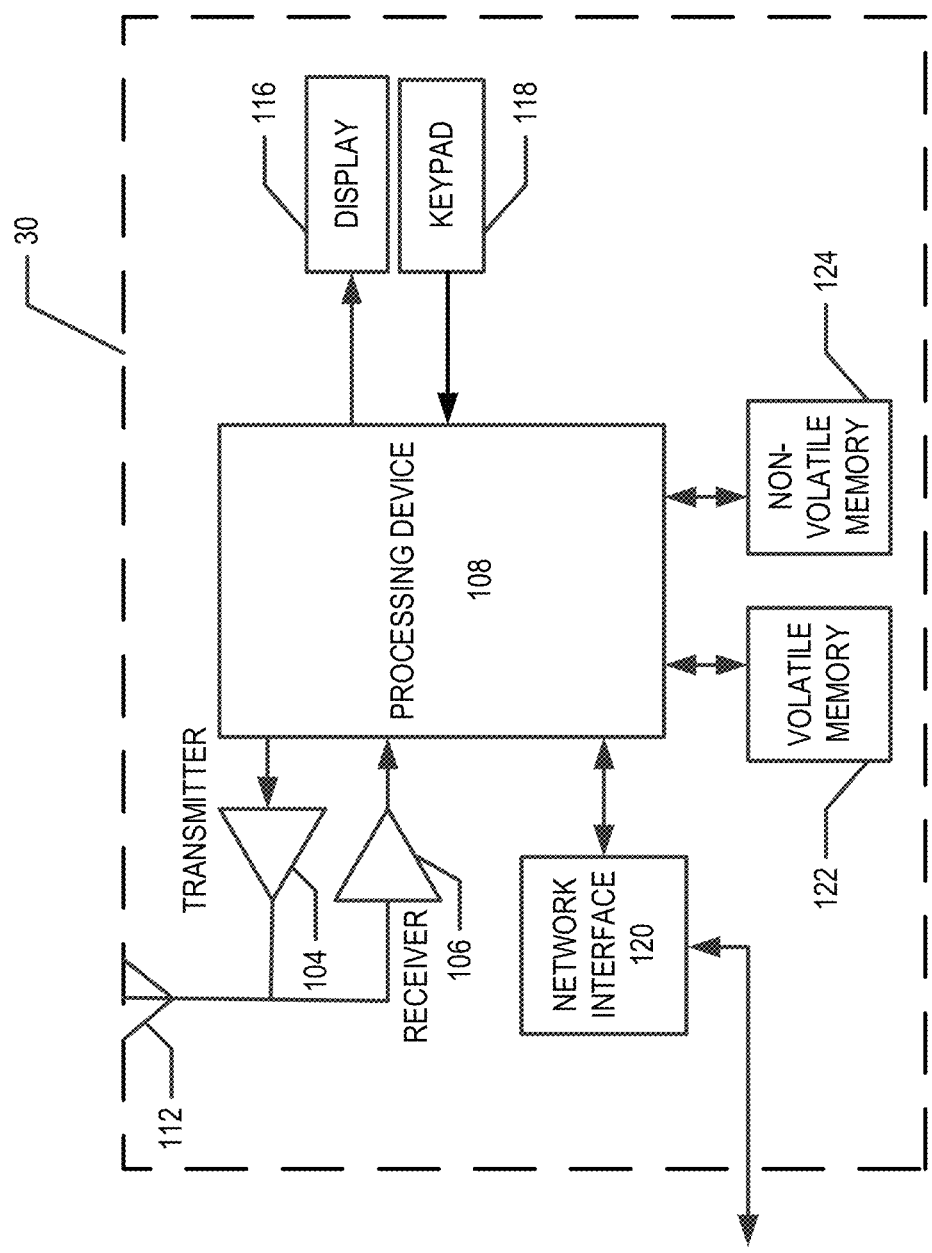
FIG. 3 is a schematic diagram of a user computing entity, in accordance with an embodiment of the present invention.

FIG. 3 provides an illustrative schematic representative of an example user computing entity 30 that can be used in conjunction with embodiments of the present invention. As shown in FIG. 3, the user computing entity 30 can include an antenna 112, a transmitter 104 (e.g., radio and/or infrared), a receiver 106 (e.g., radio and/or infrared), and a processing element 108 (e.g., CPLDs, microprocessors, multi-core processors, coprocessing entities, ASIPs, microcontrollers, and/or controllers) that provides signals to and receives signals from the transmitter 104 and receiver 106, respectively.

The signals provided to and received from the transmitter 104 and the receiver 106, respectively, may include signaling information/data in accordance with air interface standards of applicable wireless systems. In this regard, the user computing entity 30 may be capable of operating with one or more air interface standards, communication protocols, modulation types, and access types. More particularly, the user computing entity 30 may operate in accordance with any of a number of wireless communication standards and protocols, such as those described above with regard to the provider system 200. In a particular embodiment, the user computing entity 30 may operate in accordance with multiple wireless communication standards and protocols, such as UMTS, CDMA2000, 1xRTT, WCDMA, GSM<EDGE, TD-SCDMA, LTE, E-UTRAN, EVDO, HSPA, HSDPA, Wi-Fi, Wi-Fi Direct, WiMAX, UWB, IR, NFC, Bluetooth, USB, Bluetooth low energy (BLE), ZigBee, near field communication (NFC), infrared (IR), ultra-wideband (UWB), and/or the like. Similarly, the user computing entity 30 may operate in accordance with multiple wired communication standards and protocols, such as those described above with regard to the provider system via a network interface 120.

Via these communication standards and protocols, the user computing entity 30 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the user computing entity's 30 position in connection with a variety of other systems, including wireless towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, wireless towers, nearby computing devices (e.g., smartphones, laptops) and/or the like. For instance, such technologies may include the iBeacons, Gimbal proximity beacons, Bluetooth Low Energy (BLE) transmitters, NFC transmitters, infrared transmitters, ZigBee transmitters, ultra-wideband transmitters, and/or the like. These indoor positioning aspects can be used in a variety of settings to determine the location of someone or something to within inches or centimeters.

The user computing entity 30 may also comprise a user interface (that can include a display 116 coupled to a processing element 108) and/or a user input interface (coupled to a processing element 108). For example, the user interface may be a user application, browser, user interface, and/or similar words used herein interchangeably executing on and/or accessible via the user computing entity 30 to interact with and/or cause display of information/data from the provider system 200, as described herein. The user input interface can comprise any of a number of devices or interfaces allowing the user computing entity 30 to receive data, such as a keypad 118 (hard or soft), a touch display, voice/speech or motion interfaces, or other input device. In embodiments including a keypad 118, the keypad 118 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 30 can also include volatile storage or memory 122 and/or non-volatile storage or memory 124, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 30. As indicated, this may include a user application that is resident on the entity or accessible through a browser or other user interface for communicating with the provider system 200, and/or various other computing entities.

In another embodiment, the user computing entity 30 may include one or more components or functionality that are the same or similar to those of the provider system 200, as described in greater detail above. As will be recognized, these architectures and descriptions are provided for exemplary purposes only and are not limiting to the various embodiments.

Audio/Video Device 40

In example embodiments, an audio/video device may be configured to receive at least one stream corresponding to at least one media event, provide the user with the audio and/or video of the stream corresponding to the at least one media event, and/or the like. In an example embodiment, the audio/video device 40 may be configured to receive one or more signals and/or communications from a user computing entity 30. For example, the one or more signals and/or communications may cause the audio/video device 40 to turn on, change channels, switch between media streams, access and/or receive one or more media streams from one or more sources, and/or the like. In an example embodiment, an audio/video device 40 may be a television, a smart television, a user computing entity 30, a radio receiver, a vehicle radio, a high definition radio, a satellite radio, a television in communication with a "set top" box (e.g., a satellite set top box, cable box, Chromecast, Apple TV, Roku, Internet and/or Wi-Fi enabled gaming console, etc.), and/or the like. In example embodiments, an audio/video device 40 may comprise one or more elements similar to the user computing entity 30 and/or the provider system 200.

Figure 4:
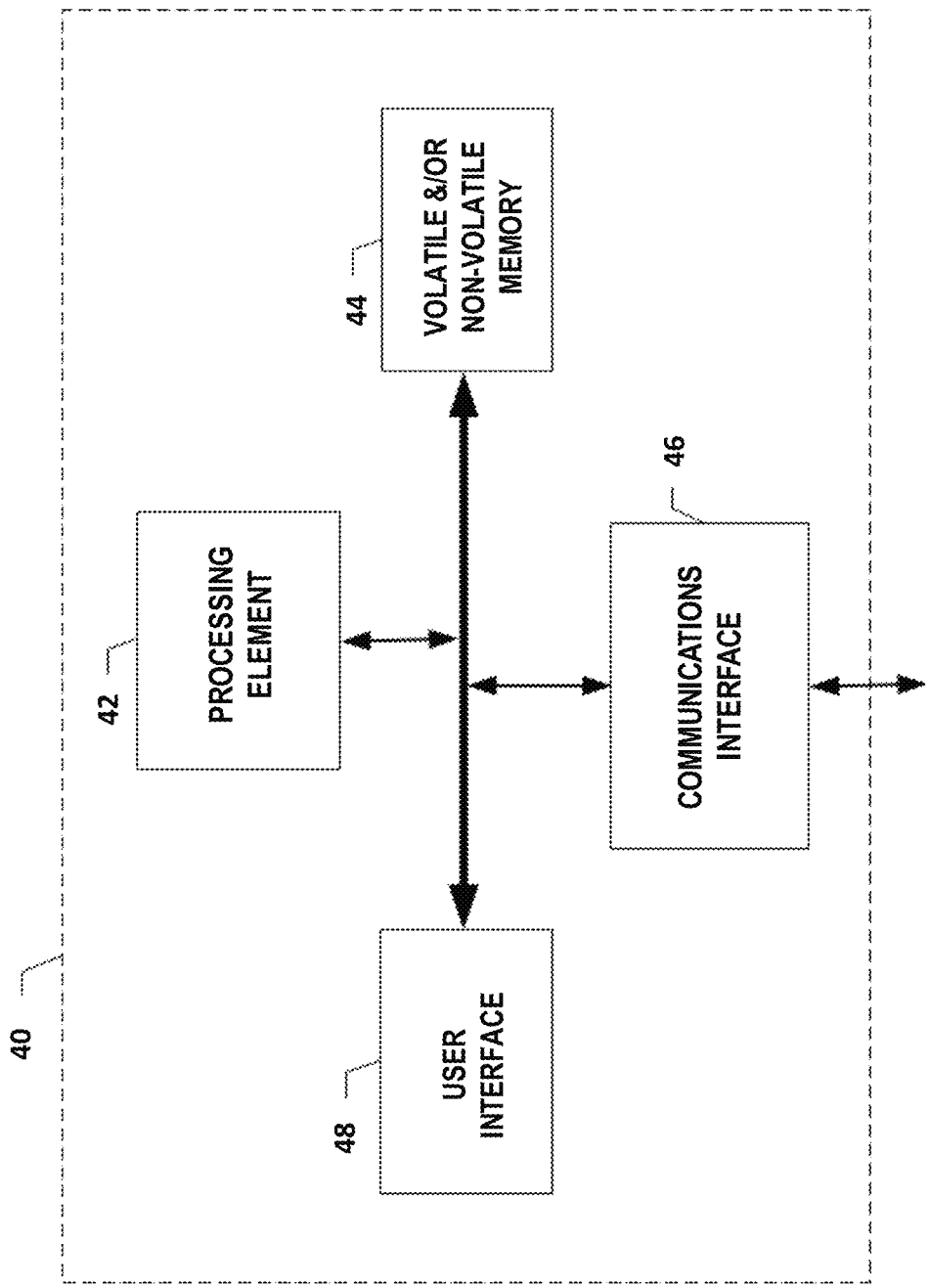
FIG. 4 is a schematic diagram of an audio/video device, in accordance with an embodiment of the present invention.

As shown in FIG. 4, in one embodiment, the audio/video device 40 may include or be in communication with one or more processing elements 42 (also referred to as processors, processing circuitry, processing device, and/or similar terms used herein interchangeably) that communicate with other elements within the audio/video device 40 via a bus, for example. As will be understood, the processing element 42 may be embodied in a number of different ways. For example, the processing element 42 may be embodied as one or more CPLDs), microprocessors, multi-core processors, coprocessing entities, ASIPs, microcontrollers, and/or controllers. Further, the processing element 42 may be embodied as one or more other processing devices or circuitry. The term circuitry may refer to an entirely hardware embodiment or a combination of hardware and computer program products. Thus, the processing element 42 may be embodied as integrated circuits, ASICs, FPGAs, PLAs, hardware accelerators, other circuitry, and/or the like. As will therefore be understood, the processing element 42 may be configured for a particular use or configured to execute instructions stored in volatile or non-volatile media or otherwise accessible to the processing element 42. As such, whether configured by hardware or computer program products, or by a combination thereof, the processing element 42 may be capable of performing steps or operations according to embodiments of the present invention when configured accordingly.

In one embodiment, the audio/video device 40 may further include or be in communication with memory 44. For example, the memory 44 may comprise non-volatile media (also referred to as non-volatile storage, memory, memory storage, memory circuitry and/or similar terms used herein interchangeably). In one embodiment, the non-volatile storage or memory may include one or more non-volatile storage or memory media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, information/data, applications, programs, program modules, scripts, source code, object code, byte code, compiled code, interpreted code, machine code, executable instructions, and/or the like. The terms database, database instance, database management system, and/or similar terms used herein interchangeably may refer to a structured collection of records or data that is stored in a computer-readable storage medium, such as via a relational database, hierarchical database, and/or network database.

In one embodiment, the memory 44 of the audio/video device 40 may further include or be in communication with volatile media (also referred to as volatile storage, memory, memory storage, memory circuitry and/or similar terms used herein interchangeably). In one embodiment, the volatile storage or memory may also include one or more volatile storage or memory media 18, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, information/data, applications, programs, program modules, scripts, source code, object code, byte code, compiled code, interpreted code, machine code, executable instructions, and/or the like being executed by, for example, the processing element 42. Thus, the databases, database instances, database management systems, information/data, applications, programs, program modules, scripts, source code, object code, byte code, compiled code, interpreted code, machine code, executable instructions, and/or the like may be used to control certain aspects of the operation of the audio/video device 40 with the assistance of the processing element 42 and operating system.

As indicated, in one embodiment, the audio/video device 40 may also include one or more communications interfaces 46 for communicating with various computing entities, such as by communicating information/data, content, information, and/or similar terms used herein interchangeably that can be transmitted, received, operated on, processed, displayed, stored, and/or the like. Such communication may be executed using a wired data transmission protocol, such as FDDI, DSL, Ethernet, ATM, frame relay, DOCSIS, or any other wired transmission protocol. Similarly, the audio/video device 40 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, IEEE 802.11 (Wi-Fi), Wi-Fi Direct, 802.16 (WiMAX), UWB, IR protocols, NFC protocols, Bluetooth protocols, Wibree, HomeRF, SWAP, wireless USB protocols, and/or any other wireless protocol. For example, an audio/video device 40 may be in communication with a user computing entity 30 through a Wi-Fi network or through direct communication via an IR protocol, a Bluetooth protocol, and/or the like. Additionally, the audio/video device 40 is in communication with one or more CDNs 10 such that the audio/video device 40 may receive a stream and/or the like of at least one media event via one or more CDNs 10.

The audio/video device 40 may further include or be in communication with one or more input and/or output elements of a user interface 48. For example, the user interface 48 may comprise input elements, such as a keyboard input, a mouse input, a touch screen/display input, motion input, movement input, audio input, pointing device input, joystick input, keypad input, remote control input, and/or the like. For example, the user interface 48 may also include or be in communication with one or more output elements, such as audio output, video output, screen/display output, motion output, movement output, and/or the like. For example, one or more media events may be presented for user consumption via the user interface 48.

As will be appreciated, one or more of the audio/video device's 40 components may be located remotely from other audio/video device 40 components, such as in a distributed system. Furthermore, one or more of the components may be combined and additional components performing functions described herein may be included in the audio/video device 40. Thus, the audio/video device 40 can be adapted to accommodate a variety of needs and circumstances. As will be recognized, these architectures and descriptions are provided for exemplary purposes only and are not limiting to the various embodiments. In general, the audio/video device 40 is a device that is used to provide the user with at least a portion of the video and/or audio data of a stream corresponding to a media event such that the user may consume the media event. In an example embodiment, the user computing entity 30 is the audio/video device 40.

IV. EXEMPLARY SYSTEM OPERATION

As described above, embodiments of the present invention provide methods, apparatus, systems, computer program products, computing devices, computing entities, and/or the like for providing users with a personalized and/or location-based experience of watching, listening to, viewing, experiencing, consuming, and/or other words used interchangeably herein, media events. For example, a user may be notified if a media event and/or a stream corresponding to a media event has a more interesting/higher interest score for the user than the media event and/or stream corresponding to a media event that the user is currently consuming. In an example embodiment, the stream being provide by the audio/video device 40 may be automatically switched to the stream having the most interesting/highest interest score. In another example, the source from which a user is assessing a stream corresponding to a media event may be automatically updated and/or the user may be notified when a new and/or better stream becomes available and how to access the new and/or better stream. For example, if a user moves from a first room where a user is consuming a media event (e.g., via a first audio/video device 40) to a second room within the user's house, a second audio/video device 40 (e.g., television, projector, projection television, smart television, and/or the like) in the second room may be automatically turned on and tuned to a channel providing a stream of the media event. In another example, if a user is driving his or her vehicle and drives out of range of one radio station through which the user is listening to a media event, a new radio station that is accessible to the user and that is broadcasting the same media event may be identified and the user may be notified thereof and/or the audio/video device 40 (e.g., the vehicle's radio) may be automatically tuned to the new radio station.

In an example embodiment, a stream corresponds to a media event and comprises stream information/data. The stream information/data comprises at least one of media event metadata (e.g., identifying the media event and/or other information/data corresponding to the media event), stream metadata (e.g., corresponding to the camera angle, the particular individuals, objects, and/or corresponding to the stream), closed captioning information/data, video data, audio data, broadcaster/channel metadata, social media data corresponding to the media event and/or stream, statistics data corresponding to the media event, and/or the like. For example, the media event metadata may identify the media event (e.g., Saints at the Falcons, football game, National Football League (NFL) game, Jan. 1, 2017 at 1 pm, and/or the like), the location of the media event (e.g., Atlanta, Ga., Georgia Dome, and/or the like), the time within the media event (e.g., second quarter, half time, time out, 3:30 left in the third quarter, and/or the like), and/or other information/data corresponding to the media event. The stream metadata may comprise information/data corresponding to the stream. For example, the stream metadata may comprise information/data regarding the camera angle shown by the video data within the stream, one or more athletes, individuals, or objects shown and/or heard in that portion of the stream (e.g., if the media event is a golf game, the stream metadata may indicate which set of golfers is being shown in the video data, if the event is the Macy's Thanksgiving Day Parade, the stream metadata may indicate which balloon, float, or marching band is currently being shown in the video data, and/or the like) names of one or more commentators, and/or the like. In an example embodiment, the video data and/or a portion thereof may be configured to be displayed (e.g., by an audio/video device 40) and/or the audio data and/or a portion thereof may be configured to be audibly provided (e.g., by an audio/video device 40) for user consumption of the media event. In an example embodiment, the closed captioning information/data may comprise text and/or the like corresponding to at least a portion of the words and/or sounds encoded in the audio data. The broadcaster/provider information/data may comprise information/data identifying one or more entities involved with producing, broadcasting, providing, and/or the like the stream. For example, the broadcaster/provider information/data may comprise a channel name, channel number, producer information/data, director information/data, and/or the like. The statistical information/data may comprise one or more statistics corresponding to the media event (e.g., current score, rushing yards per team, rushing yards for a particular player, turnovers for a team or player, etc.), one or more individuals associated with the media event (e.g., participating in the media event, mentioned by the commentators of the media event, and/or the like), and/or the like. In an example embodiment, at least a portion of the statistical information/data may be configured to be displayed via an audio/video device 40. As should be understood, multiple streams may correspond to the same media event. For example, a media event may be provided/broadcasted by multiple broadcasters and/or different camera angles of a media event may be provided in different streams. For example, returning to the golf game example, a first stream may follow a first set of golfers, and a second stream may follow a second set of golfers. In another example, the media event may be vehicle race and different streams may provide a view of the race from different vantage points about the race track. Thus, one or more streams may be referred to herein, wherein the one or more media streams may correspond to one or more media events. Various aspects of some example embodiments will now be described in more detail herein.

User Registration

In an example embodiment, before a user may access and/or utilize various features of the personalized and/or location-based consumption of media events, a user may register. For example, a user (e.g., operating a user computing entity 30) may provide profile information/data. For example, a user may use the keypad 118 and/or other input device of the user computing entity 30 to provide user input to enter and/or select profile information/data corresponding to the user. The user computing entity 30 may store the profile information/data (e.g., in volatile memory 122 and/or non-volatile memory 124) and/or provide (e.g., the processing element 108 may cause the network interface 120 to transmit) the profile information/data to a provider system 200.

Figure 5:
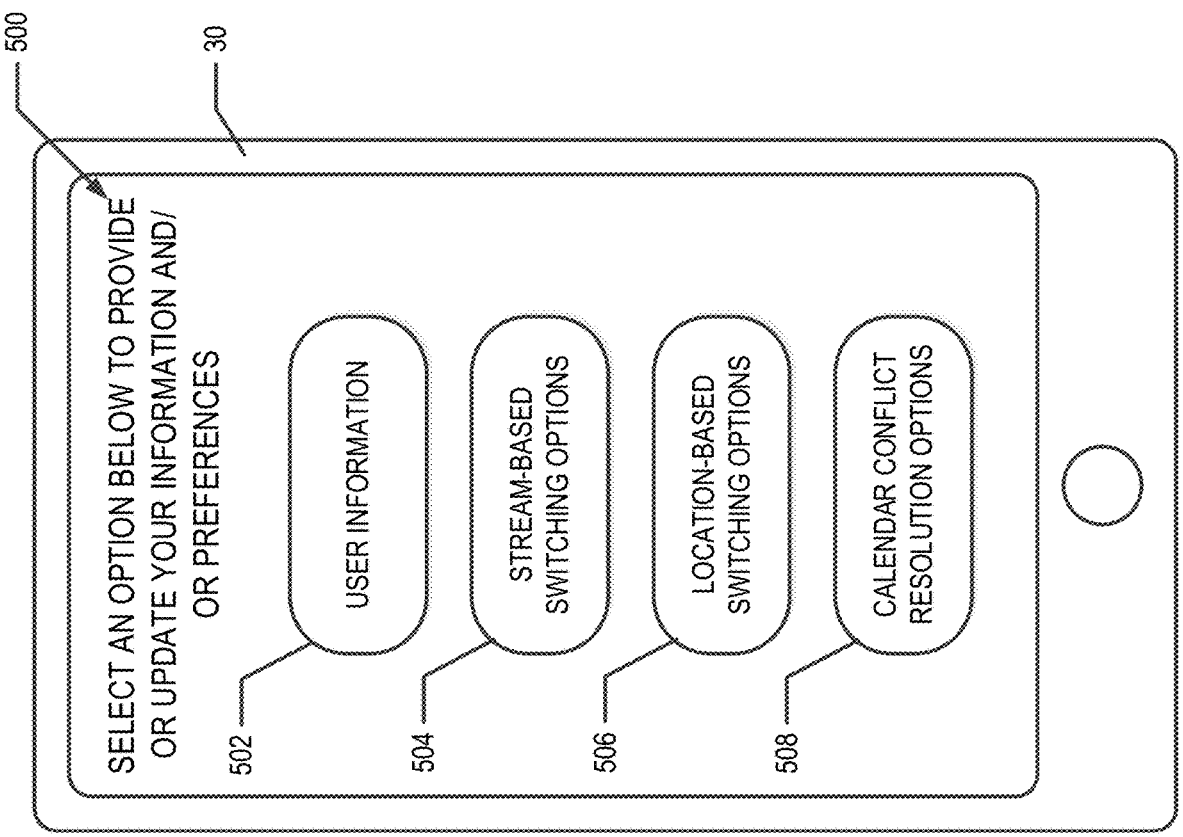
FIG. 5 illustrates an example screenshot or mockup of a user interface provided in accordance with various embodiments of the present invention.

FIG. 5 provides an example registration user interface 500 that may be provided to the user (e.g., operating the user computing entity 30) through the display 116. For example, the user may access the registration user interface 500 through a dedicated application (e.g., client module 35) operating on the user computing entity 30, an online portal accessed through a web browser (e.g., through a client module 35 operating on the provider system 200), other interface, and/or the like. In the illustrated example, the registration user interface 500 provides the user with selectable buttons/graphics that the user may select to provide various types of profile information/data. For example, the registration user interface 500 may comprise a user information/data button/graphic 502, a stream-based switching options button/graphic 504, a location-based switching options button/graphic 506, a calendar conflict resolution options button/graphic 508, and/or the like.

In an example embodiment, a user may select the user information/data button/graphic 502 and, in response thereto, user information/data may be requested from the user. For example, the registration user interface 500 may provide the user with one or more form fields, one or more selectable options, and/or the like configured for receiving user input providing user information/data. For example, user information/data may comprise one or more of a user's name; user's home address; user's city, state, and/or zip code; user's television, HD radio, satellite radio, and/or other media provider; user's internet provider; demographic information/data corresponding to the user (e.g., age, race, income level, and/or the like); household information/data (e.g., number of people in household, type of household (e.g., nuclear family, roommates, and/or the like), ages of people in household, and/or the like); restriction information/data corresponding to types of media events that should not be provided (e.g., similar to parental control options); information related to types of media events the user may be interested in (e.g., a particular sports team, a particular actor or athlete, a media event type, etc.), and/or the like. In an example embodiment, the user may be asked to provide preferences and/or information/data corresponding to how the user would like to receive various notifications, alerts, messages, and/or the like. For example, the user may indicate whether they would like to receive audible alerts, push notifications, emails to a user provided email address, text (e.g., MMS and/or SMS) messages, social media notifications, and/or the like corresponding to various events. For example, in an example embodiment, the user may choose to receive push notifications related to the stream-based switching options, audible notifications related to the location-based switching options, and text messages related to the calendar conflict resolution options, and/or the like.

In an example embodiment, a user may select the stream-based switching options button/graphic 504 and, in response thereto, stream-based switching information/data may be requested from the user. For example, the registration user interface 500 may provide the user with one or more form fields, one or more selectable options, and/or the like configured for receiving user input providing stream-based switching information/data. For example, the user (e.g., operating the user computing entity 30) may provide input turning on or turning off stream-based switching, select and/or specify one or more switching criteria, select and/or provide fan information/data, and/or the like.

For example, the one or more switching criteria may comprise one or more criteria indicating a user's interest in particular portions of a media event. For example, the user may be interested in switching media events if the media event is a sporting event and the event being switched to is in the fourth quarter, over time, the second half, third period, and/or the like. Similarly, the one or more switching criteria may indicate that a user is not interested in switching to a sporting event during the first quarter, first half, and/or the like. In an example embodiment, the one or more switching criteria provided and/or selected by the user may indicate the user may be interested in switching during any portion of the media event. The one or more switching criteria provided and/or selected by the user (e.g., operating the user computing entity 30) may indicate that the user does not wish to consume commercials and the stream should be switched for commercial breaks. In an example embodiment, the one or more switching criteria provided and/or selected by the user may indicate that the switching should not occur more often than a particular minimum switching time (e.g., every 20 seconds, 30 seconds, one minute, two minutes, five minutes, and/or the like). For example, after the stream is switched, the minimum switching time must elapse before the stream can be switched again. The one or more switching criteria provided and/or selected by the user may indicate that the user would like the stream being provided by the audio/video device 40 to be automatically switched, that the user would like to receive an audible notification notifying the user of a proposed stream switching, that the user would like to receive a push notification notifying the user of a proposed stream switching, and/or the like. For example, the audible and/or push notification may comprise information/data necessary for the user to switch the stream being provided by the audio/video device 40 if he or she wishes to view the suggested new stream. If the user indicates that stream provided by the audio/video device 40 is to be automatically switched, the user may provide information/data regarding how the stream is to be changed. For example, the user may provide information/data so that the user computing entity 30 may communicate with the audio/video device 40 through IR protocol, Bluetooth Protocol, the Wi-Fi network within the user's home, and/or the like.

In an example embodiment, a user may provide fan information/data. For example, the user may indicate one or more individuals, teams, leagues, producers, directors, genres, and/or the like that the user may be interested in. For example, the user may select and/or provide fan information/data identifying one or more sports, professional leagues (e.g., NFL, NBA, WNBA, MLB, MLS, Premier League, and/or the like) and/or amateur leagues (e.g., NCAA football, NCAA basketball, NCAA women's basketball, NCAA baseball, World Cup Soccer, Olympics, and/or the like) of which the user is interested in consuming media events corresponding thereto. In another example, a user may select and/or provide fan information/data corresponding to one or more genres. For example, a user may indicate that he or she is interested in broadcasts of concerts by country music artists, live television performances of musicals, Christmas movies, and/or the like. In an example embodiment, the user may select and/or provide fan information/data identifying one or more teams (Atlanta Hawks, New England Patriots, Minnesota Lynx, Boston Red Sox, University of Florida Gators, Georgia Tech Yellow Jackets, Team USA, and/or the like) the user may be interested in consuming media events corresponding thereto. In another example, the user may indicate one or more musical groups (e.g., Boston Pops Orchestra, U2, and/or the like), dance groups (e.g., Atlanta Ballet, Super Cr3w, and/or the like), acting groups (e.g., The Second City, and/or the like), and/or the like the user is interested in consuming media events corresponding thereto. In an example embodiment, a user may provide and/or select fan information/data identifying one or more athletes, coaches, performers, singers, actors, producers, composers, directors, and/or the like the user is interested in consuming media events corresponding thereto. In an example embodiment, the user may rank sports, leagues, genres, groups/teams, and/or individuals provided and/or selected as part of the fan information/data. For example, a user may rank sports, leagues, genres, groups/teams, and/or individuals identified in the fan information/data to indicate that the user prefers to consume media events featuring Matt Ryan over consuming basketball games, prefers to consume basketball games over NFL games, prefers to consume NFL games over the University of Florida Gators, and prefers to the University of Florida Gators over World Cup soccer. For example, in an example embodiment, the user may rank each and/or one or more sports, leagues, genres, groups/teams, and/or individuals identified in the fan information/data relative to the other sports, leagues, genres, groups/teams, and/or individuals identified in the fan information/data. In an example embodiment, the user may rank each and/or one or more sports, leagues, genres, groups/teams, and/or individuals identified in the fan information/data individually on a scale of most interesting to least interesting.

In an example embodiment, a user may select the location-based switching options button/graphic 506 and, in response thereto, location-based switching information/data may be requested from the user. For example, the registration user interface 500 may provide the user with one or more form fields, one or more selectable options, and/or the like configured for receiving user input providing location-based switching information/data. For example, the user may provide and/or select device turn-on and/or switching criteria for one or more audio/video devices 40. For example, a user may indicate that if an audio/video device 40 is already on, the audio/video device 40 should not be switched to a stream corresponding to the media event the user is and/or was consuming using a different audio/video device 40. In another example, the user may indicate that if the audio/video device 40 is on, the stream provided by the audio/video device 40 should be switched to the stream corresponding to the media event the user is and/or was consuming using a different audio/video device 40. The location-based switching information/data may further comprise a map of audio/video devices 40. For example, the user may provide device information/data corresponding to one or more audio/video devices 40 that the user would like to use with the location-based switching. For example, the user may provide information/data identifying the user's vehicle's radio, the user's living room television, the user's kitchen television, the user's man cave television, a user's tablet, and/or the like such that, when the user (e.g., as determined based on the location of the user computing entity 30) is nearby to an audio/video device 40, the audio/video device may be turned on and/or switched to a stream corresponding to a media event that that the user is and/or was consuming using a different audio/video device 40 and/or a media event that it is expected the user would like to consume (e.g., based on fan information/data stored in association with the profile information/data corresponding to the user). For example, an audio/video device 40 may be nearby a user when the audio/video device is closer to the user computing entity 30 than any of the other audio/video devices 40 eligible to be used via the location-based switching option. For example, if the user registers his or her vehicle's car radio, his or her living room television, and his or her kitchen television, and the user (and the user computing entity 30) are located in the kitchen, the kitchen television may be determined to be nearby. Additionally, an audio/video device 40 may be considered to be nearby if the user computing entity 30 is in location wherein the user computing entity 30 may communicate with the audio/video device 40 using, for example, an IR protocol, Bluetooth protocol, using a local Wi-Fi network (e.g., the user's home Wi-Fi network), a short range or intermediate range communication technology, and/or the like. Registering an audio/video device 40 may comprise providing and/or selecting audio/video device information/data. For example, the audio/video device information/data may comprise information/data identifying one or more audio/video devices 40 and/or required for the user computing entity 30 to communicate with the audio/video device 40, information/data identifying streams available to the audio/video device 40 (e.g., cable provider, satellite provider, Internet capabilities, and/or the like). For example, audio/video device information/data may also be received, provided, detected, assigned, collected, requested, and/or similar words used herein interchangeably as part of the profile information/data corresponding to the user. The audio/video device information/data may include one or more audio/video device identifiers—phone numbers, Subscriber Identity Module (SIM) numbers, Media Access Control (MAC) addresses, International Mobile Subscriber Identity (IMSI) numbers, Internet Protocol (IP) addresses, Mobile Equipment Identifiers (MEIDs), unit identifiers (e.g., GPS unit identifiers, Unique Device Identifiers (UDiDs), mobile identification numbers (MINs), IMSI_S (Short IMSIs), email addresses, usernames, user IDs, Globally Unique Identifiers (GUIDs), Integrated Circuit Card Identifiers (ICCIDs), electronic serial numbers (ESN), International Mobile Equipment Identities (IMEIs), Wi-Fi IDs, RFID tags, and/or the like. The audio/video device information/data may include a device's vendor, model, specification authority, version, components, software specification and/or version, person(s) associated with the device, and/or the like. The audio/video device or entity information/data may be used to communicate with and/or verify communications to and/or from the corresponding audio/video device 40.

In an example embodiment, a user may select the calendar conflict resolution options button/graphic 508 and, in response thereto, calendar conflict resolution information/data may be requested from the user. For example, the registration user interface 500 may provide the user with one or more form fields, one or more selectable options, and/or the like configured for receiving user input selecting and/or providing calendar conflict resolution information/data. For example, the calendar conflict resolution information/data may comprise information/data needed to access a user's digital calendar. For example, the user may provide access to the user's digital calendar resident on the user computing entity 30. The calendar conflict resolution information/data may further comprise information/data regarding the user's recording devices (e.g., DVR and/or the like) that may be in communication with an audio/video device 40 and/or the user computing entity 30. The calendar conflict resolution information/data may further comprise notification preferences. For example, the notification preferences may include information/data relating to how far in advance of the beginning of a media event a user would like be notified regarding the media event, how the user would like to be notified (e.g., push notification, email, text message, kik, snapchat, tweet, voice notification, and/or the like). The calendar conflict resolution information/data may further comprise fan information/data similar to the fan information/data described above.

Stream-Based Switching Option

In an example embodiment, the user may turn on the stream-based switching option provided by the client module 35 (e.g., operating on the user computing entity 30 and/or operating on the provider system 200 and accessed through the user computing entity 30). At some point after turning on the stream-based switching option, the user may initiate a stream-based switching enabled media event consuming session. For example, the user may turn on an audio/video device 40 and change the channel to a college football game on Saturday afternoon. In an example embodiment, the user may open the client module 35 operating on the user computing entity 30 and/or access the client module 35 operating on the provider system 200 through the user computing entity 30 to provide input initiating the stream-based switching enabled media event consuming session. In an example embodiment, the user computing entity 30 (e.g., via the client module 35) may be configured to communicate with the audio/video device 40 to automatically determine that a stream-based switching enabled media event consuming session has been initiated.

Figure 6:
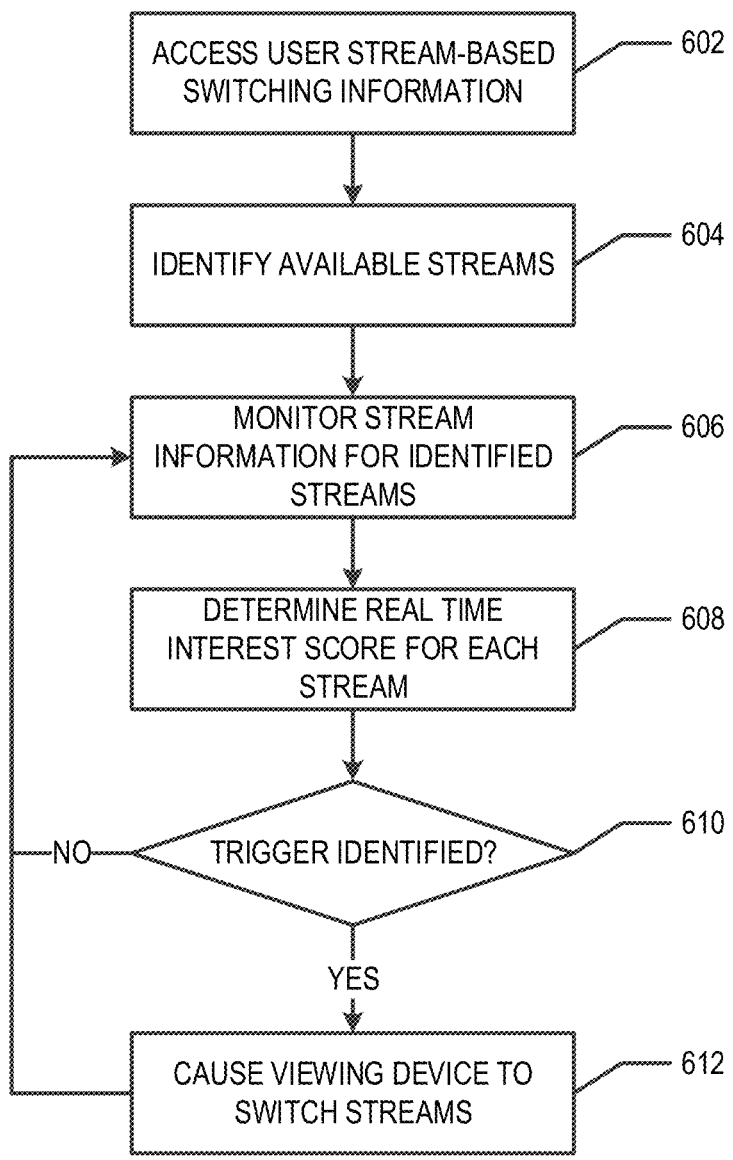
FIGS. 6-12 provide flowcharts illustrating various processes, procedures, and/or operations for providing a personalized and/or location-based experience of consuming media events, in accordance with various embodiments of the present invention.

FIG. 6 provides a flowchart of various processes and procedures that may be used to provide the user with a stream-based switching option enabled media event consuming session. Starting a block 602, in response to the user initiating a stream-based switching enabled media event consuming session, the user's profile information/data may be accessed. For example, the user computing entity 30 and/or the provider system 200 may access the user's profile information/data. For example, the stream-based switching information/data (e.g., including the fan information/data) may be accessed, for example, from a profile database stored by the provider system 200 (e.g., in memory 216) or stored by the user computing entity 30 (e.g., in memory 122/124).

At block 604, one or more media events for which streams are currently available are identified. For example, the user computing entity 30 and/or the provider system 200 may access the event database 250 to identify media events for which streams are currently available. For example, the event database 250 may comprise a listing of media events, streams corresponding to the media events, how to access each of the streams corresponding to the media events (e.g., which channel the stream is being broadcasted on, a universal resource location (URL) and/or the like for an internet-based stream, and/or the like). In an example embodiment, each available stream in the event database 250 may be identified. In an example embodiment, available streams that have feature and/or corresponding to at least one sport, league, genre, group/team, and/or individual identified in the user's fan information/data may be identified from the event database 250. In an example embodiment, the user computing entity 30 and/or provider system 200 may communicate with one or more CDNs 10 (e.g., one or more CDNs 10 corresponding to paid or unpaid subscriptions corresponding to the user, the user's media provider, and/or the like) to identify the media events for which streams are currently available.

At block 606, the stream information/data for the identified streams may be monitored. For example, the user computing entity 30 and/or the provider system 200 may monitor the stream information/data for the identified streams. For example, the stream information/data may be monitored to identify, extract, determine, and/or the like stream information/data that may be used to determine, compute, and/or the like a stream interest score. For example, closed captioning information/data may be monitored to determine when a commercial break is beginning and/or ending, if play is currently occurring, and/or the like. The stream metadata may be monitored to determine the time remaining and/or played in the media event (e.g., amount of time remaining on the game clock, current quarter/half/period, and/or the like); individuals currently on the field, stage, court, and/or the like; and/or the like. Various stream information/data may be monitored for extracting, identifying determining, and/or the like stream information/data that may be used to determine how interesting a user may find a stream based on the current happenings within the media event corresponding to the stream.

At block 608, a stream interest score is determined, computed, and/or the like for each identified stream. For example, the user computing entity 30 and/or the provider system 200 may determine, compute, and/or the like a stream interest score for each identified stream. In example embodiments, the stream interest score may be based on the current events, conditions, play, and/or the like of the media event corresponding to the stream for which the stream interest score corresponds. In an example embodiment, the stream interest score is determined, computed and/or the like based on the stream-based switching information/data corresponding to the user. For example, the stream interest score may be personalized based on the stream-based switching information/data, such as the fan information/data. In an example embodiment, the stream interest score is determined, computed, and/or the like in real time or near real time with regard to the events occurring (e.g., as indicated in meta data and/or the like corresponding to the audio/video stream).

At block 610, it is determined if a stream-switch trigger has been identified. For example, the user computing entity 30 and/or the provider system 200 may determine if a stream-switch trigger has been identified. In an example embodiment, a stream-switch trigger may be identified when a user is currently consuming a first stream having a first stream interest score and a second stream interest score corresponding to a second stream indicates that the second stream may be more interesting to the user currently than the first stream is. For example, in one embodiment, the second stream interest score may be higher than the first stream interest score. In some embodiments, switch criteria may also be used to determine if a stream-switch trigger has been identified, as will be discussed elsewhere herein with respect to FIG. 7.

If, at block 610, it is determined that a stream-switch trigger has not been identified, the process returns to block 606 to continue monitoring the identified streams. If, at block 610, it is determined that a stream-switch trigger has been identified, the process continues to block 612. At block 612, the audio/video device 40 may be caused to provide a new stream for user consumption. For example, the user computing entity 30 and/or provider system 200 may cause the audio/video device 40 to provide a new stream for user consumption. For example, if a user is currently consuming a first stream having a first stream interest score and a second stream interest score corresponding to a second stream indicates that the second stream may be more interesting to the user currently than the first stream is, the audio/video device may be automatically switched to providing the second stream for the user's consumption. For example, the user computing entity 30 may change the channel or initiate a new stream request of the audio/video device 40 using an IR and/or Bluetooth protocol or through the user's home Wi-Fi network such that the second stream is provided by the audio/video device 40. In another example embodiment, the user computing entity 30 may be the audio/video device 40 and the stream provided thereby may be automatically switched to the second stream. As should be understood, in some embodiments, instead of automatically switching the stream provided to the user by the audio/video device 40, the user computing entity 30 may provide the user with a stream-switch notification. For example, a stream-switch notification may be an audible notification, push notification, and/or the like. The notification may indicate the second stream and how the user may access the second stream. For example, the notification may comprise the text "The Saints and Falcons game is getting really exciting! Switch to Channel 846 to watch now!" In another example embodiment, the notification may provide a URL or other identifier/indicator that the user may use to access the second stream via the audio/video device 40. After automatically switching the stream provided to the user through the audio/video device 40 and/or providing a notification, the process may return to block 606 to continue monitoring the identified streams. In an example embodiment, the interest score may be determined by the provider system 200 and, responsive to a stream switch trigger has been identified, the provider system may provide (e.g., transmit) a stream switch trigger message to the user computing entity 30. The client module 35 and/or user computing entity 30 may receive the stream switch trigger message (e.g., via the network interface 120) and process the stream switch trigger message (e.g., via the processing device 108). The processing of the stream switch trigger message may cause the notification to be provided by the user computing entity 30 (e.g., via the display 116 and/or via an audio/speaker component of the user computing entity 30) and/or cause the user computing entity 30 to communicate and/or provide a signal to the audio/video device causing the audio/video device to automatically switch the stream being provided for user consumption.

Figure 7:
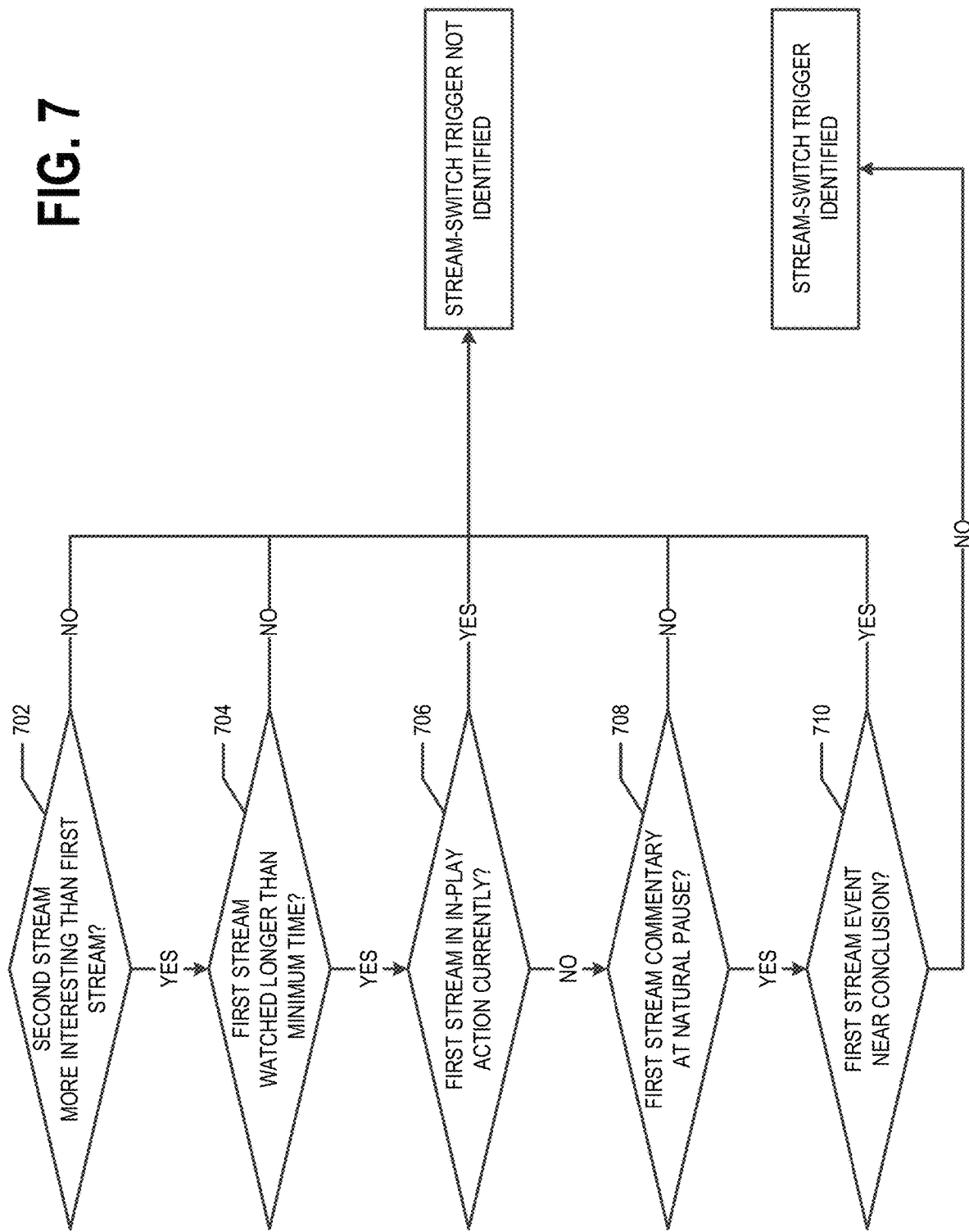

FIG. 7 provides a flowchart of example processes and procedures that may be completed to identify a stream-switch trigger, according to an example embodiment. Starting at block 702, it is determined if a second stream is currently (e.g., in real time or near real time) more interesting that the first stream that the user is currently consuming (e.g., via the audio/video device 40). For example, based on a real time or near real time first stream interest score corresponding to the first stream (which the user is consuming via the audio/video device 40) and a real time or near real time second interest stream corresponding to the second stream, it may be determined if the second stream is currently more interesting than the first stream. For example, the user computing entity 30 (e.g., via processing element 108), audio/video device 40 (e.g., via processing element 42), and/or the provider system 200 (e.g., via processor 210) may determine if the second stream is more interesting than the first stream. In example embodiments, the first stream interest score and the second stream interest score may be based at least in part on the profile information/data (e.g., fan information/data) corresponding to the user. As should be understood, the interest score may be determined for one or more second streams.

If, at block 702, it is determined that the second stream is not more interesting than the first stream, then a stream-switch trigger may not be identified and the process may return to block 702. If, at block 702, it is determined that the second stream is more interesting than the first stream, the process continues to block 704. At block 704, it is determined if the audio/video device 40 has been providing the first stream for longer than the minimum switching time. For example, the user computing entity 30 (e.g., via processing device 108), audio/video device 40 (e.g., via processing element 42), and/or the provider system 200 (e.g., via processor 210) may determine if the first stream has been provided for at least the minimum switching time. For example, the minimum switching time may be the threshold period of time that the user computing entity 30 and/or provider system 200 causes to elapse between switching of streams and/or identifying a new stream-switch trigger. In an example embodiment, the minimum switching time is determined based on the switching criteria of the profile information/data corresponding to the user.

If, at block 704, it is determined that first stream has been provided by the audio/video device 40 for less than the minimum switching time, then a stream-switch trigger may not be identified. If at block 704, it is determined that the first stream has been provided by the audio/video device 40 for at least as long as the minimum switching time, the process continues to block 706. At block 706, it is determined if the media event provided by the first stream is currently in in-play action. For example, the user computing entity 30 (e.g., via processing element 108), audio/video device 40 (e.g., via processing element 42), and/or the provider system 200 (e.g., via processor 210) may determine if the media event provided by the first stream is currently in in-play action. For example, the determination of whether or not the media event provided by the first stream is currently in in-play action may be determined based at least in part on the stream information/data corresponding to the first stream. For example, if the first stream is currently providing a commercial, half-time commentary, time-out and/or between play commentary, intermission, and/or the like, it may be determined that the media event corresponding to the first stream is not in in-play action. In an example embodiment, the determination of whether or not a media event is in in-play action may be based on switching criteria in a user's profile information/data. In an example embodiment, the real time or near real time interest score for the first stream may take into account whether or not the first stream is current in in-play action, and/or the like, such that the actions of block 706 may be incorporated into the actions of block 702.

If at block, 706 it is determined that the media event provided by the first stream is in in-play action, a stream-switch trigger may not be identified. If, at block 706, it is determined that the media event provided by the first stream is not in in-play action, the process continues to block 708. At block 708, it is determined if the first stream commentary is at a natural pause. For example, the closed captioning information/data may be analyzed to determine if the first stream commentary is at a natural pause. For example, the user computing entity 30, audio/video device 40, and/or provider system 200 may determine if the first stream commentary is at a natural pause. For example, the first stream commentary may be at a natural pause if the first stream is providing a commercial, between commentary segments, the commentary is merely filing time, and/or the like. In an example embodiment, the determination of whether or not the first stream commentary is at a natural pause may be based on switching criteria in a user's profile information/data. In an example embodiment, the real time or near real time interest score for the first stream may take into account whether or not the first stream is currently at a natural pause, and/or the like, such that the actions of block 708 may be incorporated into the actions of block 702.

If at block 708 it is determined that the first stream commentary is not at a natural pause, a stream-switch trigger may not be identified. If, at block 708, it is determined that the first stream commentary is at a natural pause, the process continues to block 710. At block 710 it is determined if the first stream media event is near conclusion. For example, it may be determined if the first stream media event has less than thirty seconds of game clock time remaining, less than two minutes of game clock time remaining, less than five minutes of game clock time remaining, and/or the like. For example, it may be determined if the first stream media event is near conclusion based at least in part on the switching criteria in the profile information/data corresponding to the user, the corresponding stream information/data, and/or the like. In an example embodiment, the user computing entity 30, audio/video device 40, and/or provider system 20 may determine if the media event provided by the first stream is near conclusion. In an example embodiment, the real time or near real time interest score for the first stream may take into account whether or not the first stream is currently near conclusion, and/or the like, such that the actions of block 710 may be incorporated into the actions of block 702.

If, at block 710, it is determined that the media event provided by the first stream is near conclusion, a stream-switch trigger may not be identified. If, at block 710, it is determined that the media event provided by the first stream is not near conclusion, a stream-switch trigger may be identified. In an example embodiment, the provider system 200 may identify a stream switch trigger and, responsive thereto, generate and provide (e.g., transmit) a stream switch trigger message to the user computing entity 30. Responsive to the receipt and processing of the stream switch trigger message, the user computing entity 30 may generate and provide a stream switch notification and/or automatically cause the audio/video device 40 to switch from providing the first stream to providing the second stream. In an example embodiment, the user computing entity 30 may identify a stream switch trigger and, responsive thereto, may generate and provide a notification and/or cause the audio/video device 40 to switch from providing the first stream to providing the second stream.

In an example embodiment, the user computing entity 30 or a recording device associated with the audio/video device 40 may start recording the second stream responsive to the second stream interest score being higher and/or more interesting than the first stream interest score, such that when the audio/video device 40 is switched to the second stream (e.g., once the first stream is at a natural pause, not in-play, and/or the minimum switch time has elapsed), the second stream is provided from the point at which the second stream was identified as being more interesting than the first steam based on the recorded portion of the second stream. For example, the provider system 200 and/or the user computing entity 30 may provide (e.g., transmit) a message to the user computing entity 30 and/or audio/video device 40 that, when processed by the receiving device, causes the second stream to be recorded by the receiving device and/or a recording device associated therewith.

Figure 8:
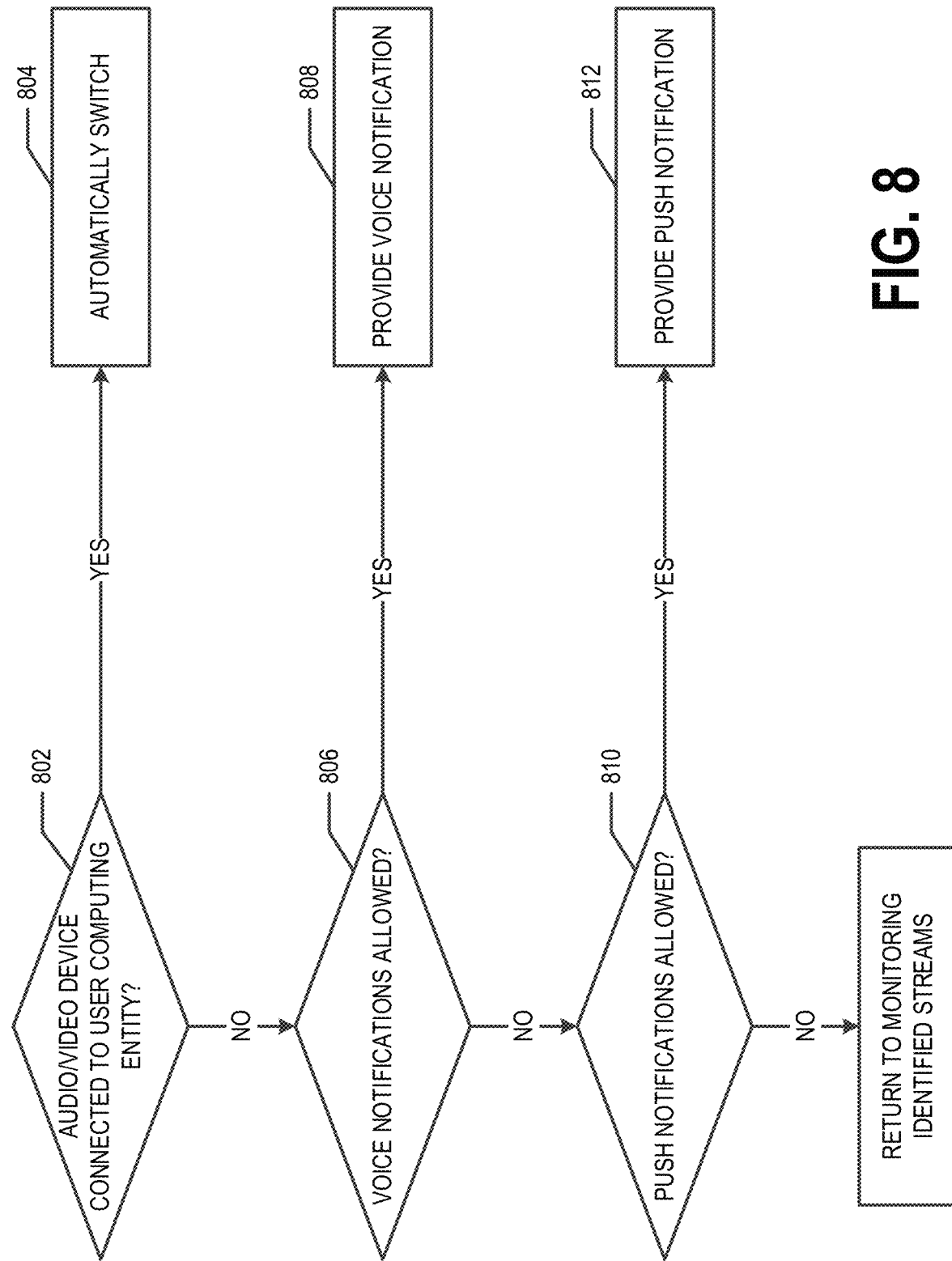

FIG. 8 provides a flowchart illustrating processes and procedures that may be used to automatically switch the stream provided by the audio/video device 40 and/or to provide a switch notification after (e.g., responsive to) a stream-switch trigger has been identified. Starting at block 802, it is determined if the audio/video device 40 is connected to the user computing entity 30. For example, the user computing entity 30 may access the profile information/data to identify one or more audio/video devices 40 associated with the user. Based on the profile information/data, the user computing entity 30 (e.g., the client module 35) may determine if the user computing entity 30 is in communication with the audio/video device 40 and/or if the user computing entity 30 can initiate communication with the audio/video device 40. In an example embodiment, the user computing entity 30 (e.g., the client module 35) may attempt perform a handshaking routine and/or other form of communication with the audio/video device 40 to determine if the user computing entity 30 can initiate communication with the audio/video device 40. If, at block 802, it is determined that the user computing entity 30 is connected to the audio/video device 40, the user computing entity 30 may automatically cause the audio/video device 40 to provide the second stream, at block 804. For example, responsive to receipt and processing of a stream switch trigger message and/or the identification of a stream switch trigger, the user computing entity 30 (e.g., the client module 35) may generate and provide a communication to the audio/video device including a command to switch channels or other stream source such that the audio/video device 40 provides the second stream. For example, audio/video device 40 may receive the communication including the command from the user computing entity 30 and process the communication. The processing of the communication comprising the command may cause the audio/video device 40 to switch channels or other stream sources such that the audio/video device 40 provides the second stream.

If, at block 802, it is determined that the user computing entity 30 is not in communication with the audio/video device 40, the process continues to block 806. At block 806, it is determined if voice/audio notifications are allowed. For example, the user computing entity 30 (e.g., the client module 35) may determine if voice/audio notifications are allowed. For example, the profile information/data may be accessed to determine if voice/audio notifications are allowed. In another example, the user computing entity 30 information/data may be accessed to determine if the user computing entity 30 is in a silent, vibrate only, or audible notification mode to determine if voice/audio notifications are allowed. If, at block 806, it is determined that voice/audio notifications are allowed, an audible switch notification may be provided at block 808. For example, the user computing entity 30 may provide an audible switch notification. In an example embodiment, a switch notification may comprise information/data identifying the second stream and information/data regarding how the user may access the second stream for consumption (e.g., the channel number and/or the like). For example, a speaker element of the user computing entity 30 may be caused (e.g., by the processing element 108) to provide the audible switch notification.

If, at block 806, it is determined that voice/audible notifications are not allowed, the process continues to block 810. At block 810, it is determined if push notifications are allowed. For example, the user computing entity 30 (e.g., client module 35) may determine if push notifications are allowed (e.g., based on profile information/data corresponding to the user, a current setting of the user computing entity 30, and/or the like). For example, the user computing entity 30 may access the profile information/data and/or user computing entity information/data to determine if push notifications are allowed. If it is determined at block 806 that push notifications are allowed, the process continues to block 812 and a non-audible switch notification (e.g., via a push notification) is provided. For example, a non-audible notification may be displayed on a display of the user computing entity 30. In an example embodiment, a switch notification may comprise information/data identifying the second stream and information/data regarding how the user may access the second stream for consumption (e.g., the channel number and/or the like).

After automatically changing the stream, providing an audible switch notification, providing a non-audible switch notification, or determining that push notifications are not allowed, the process may return and/or continue to monitoring the identified streams.

Location-Based Switching Option

Figure 9:
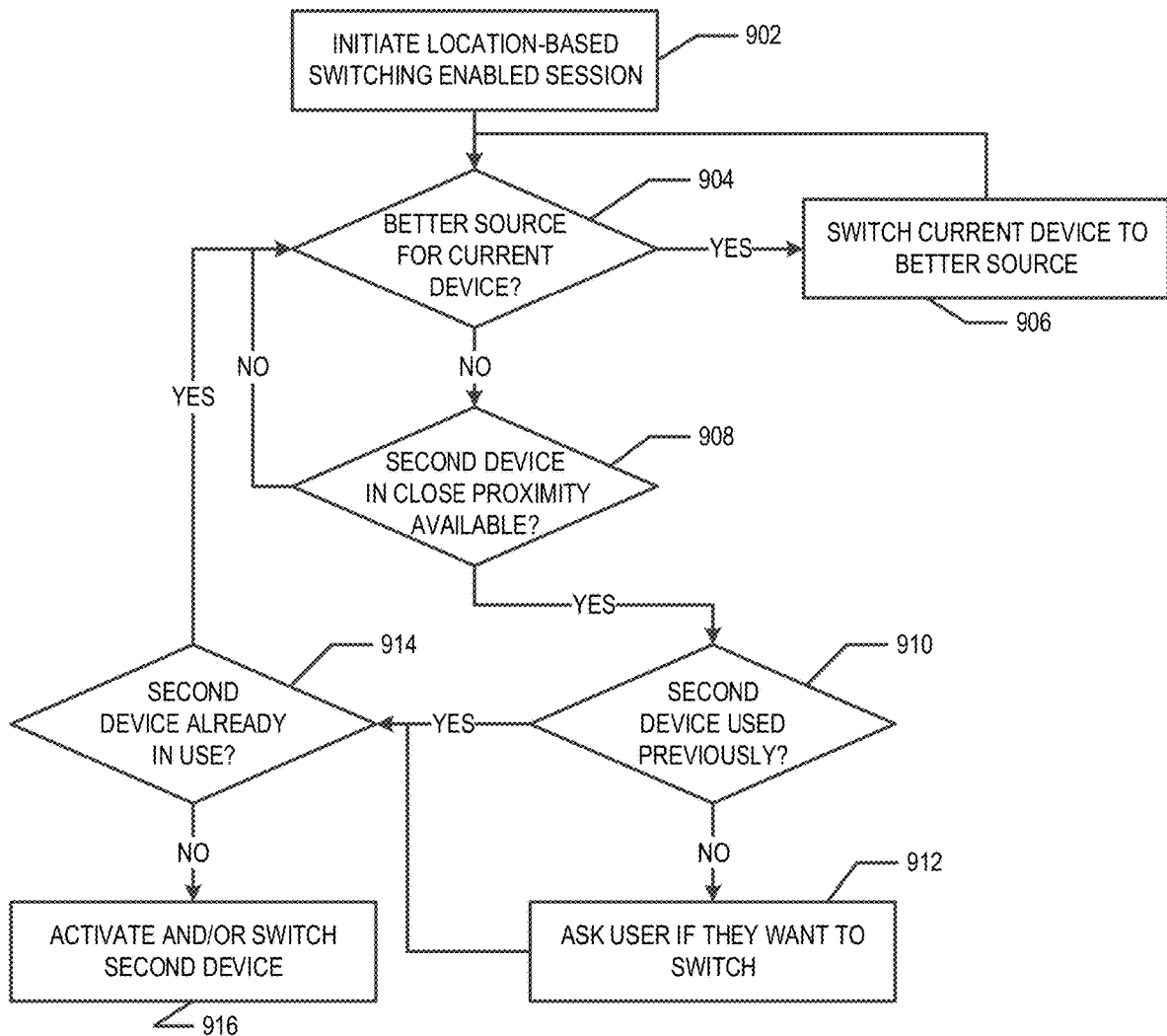

In an example embodiment, the user may turn on the location-based switching option provided by the client module 35 (e.g., operating on the user computing entity 30 and/or operating on the provider system 200 and accessed through the user computing entity 30). FIG. 9 provides a flowchart illustrating a technique for providing a user with a location-based switching option. Starting at block 902, at some point after turning on the location-based switching option (e.g., via the client module 35), the user may initiate a location-based switching enabled media event consuming session. For example, the user may turn on an audio/video device 40 and change the channel or initiate a new stream request to a college football game on Saturday afternoon. In another example, a user may be in his or her vehicle and turn on a baseball game on the vehicle's radio. In an example embodiment, the user may open the client module 35 operating on the user computing entity 30 and/or access the client module 35 operating on the provider system 200 through the user computing entity 30 to provide input initiating the location-based switching enabled media event consuming session. For example, the user may access a stream corresponding to a media event using a first audio/video device 40. In an example embodiment, the user computing entity 30 may communicate with the first audio/video device 40 to determine and/or automatically identify that a location-based switching enabled media event consuming session has been initiated.

At block 904, it is determined if there is a better stream corresponding to the media event available for the current audio/video device 40. For example, the user computing entity 30 may determine if there is a better stream corresponding to the media event available for the first audio/video device 40. For example, it may be determined if another station and/or media provider is providing a stream corresponding to the media event that may that may be a more interesting stream and/or that may have better reception by the audio/video device 40 (e.g., a radio station that is expected to come in more clearly based on the broadcast area of the radio station and the location of the audio/video device 40 and/or the user computing entity 30, and/or the like). In an example embodiment, the client module 35 (e.g., operating on the user computing entity 30 and/or operating on the provider system 200 and accessed via the user computing entity 30) may cause a location determining sensor and/or device of the user computing entity 30 to determine the geolocation of the user computing entity 30. The client module 35 may then provide the geolocation of the user computing entity 30 to the provider system 200 and/or access a database stored on the user computing entity 30 or the provider system 200 to determine if a stream is available for the geolocation of the user computing entity 30 (and the user) and/or to identify any streams available for the geolocation of the user computing entity 30 (and the user) that are providing/broadcasting the media event. It may then be determined, by the client module 35 (e.g., operating on the user computing entity 30 and/or operating on the provider system 200 and accessed via the user computing entity 30) if the a second stream that has been identified as providing the media event would be a better stream for the user based on an interest score, as described above, and/or expected reception quality of the second stream by the audio/video device 40. In an example embodiment, the user's cable provider, satellite provider, media subscriptions, and/or the like (e.g., as indicated by the profile information/data) may be used to determine if a better stream is available. In another example embodiment, the user's home may contain one or more beacons. Information/data regarding the signal strength of the one or more beacons at the location of one or more audio/video devices 40 may be stored as part of the profile information/data corresponding to the user. For example, the location-based switching information/data may comprise a map of one or more audio/video devices 40 and beacon location and/or signal strength information/data relating to the one or more audio/video devices 40. The beacon location and/or signal strength information/data for the audio/video device 40 may be used to identify second streams providing the media event at the user's location (e.g., at the audio/video device's 40 location) and the expected reception thereof.

If, at block 904, it is determined that a better stream corresponding to the media event is available for the first audio/video device 40, the audio/video device 40 may be switched to providing the better stream at block 906. For example, the user computing entity 30 (e.g., via the client module 35) may cause the first audio/video device 40 to provide the better stream. For example, the client module 35 may generate a communication comprising a stream switch command and provide (e.g., cause the transmission of) the communication comprising the stream switch command. The first audio/video device 40 may receive the communication comprising the stream switch command (e.g., via the communication interface thereof) and process the communication. The processing of the communication by the first audio/video device 40 (e.g. via the processing element 42) may cause the stream switch command to be executed, thereby causing the first audio/video device 40 to provide the second stream for the user's consumption. In an example embodiment, at block 906, the user computing entity 30 may provide the user with an audible or non-audible switching alert providing the user with information/data regarding how to switch the first audio/video device 40 to better stream, rather than automatically causing the first audio/video device 40 to switch to the second stream.

If at block 904, it is determined that a better stream is not available, the process continues to block 908. At block 908 it is determined if a second audio/video device is in close proximity (e.g., in the same room, portion of the house, within a threshold distance of the user/user computing entity 30, and/or the like). For example, the user computing entity 30 may provide a signal (e.g., via IR protocol, Bluetooth protocol, local Wi-Fi network). If a second audio/video device 40 receives the signal, the audio/video device 40 may provide a response signal such that the user computing entity 30 determines that the second audio/video device 40 is in close proximity to the user computing entity 30 (and the user). In an example embodiment, the second audio/video device 40 may comprise an RFID tag and/or the like such that the user computing entity 30 may identify that the second audio/video device 40 is in close proximity thereto by interrogating the RFID tag and/or the like. In another example, the user computing entity 30 may access the profile information/data to identify one or more audio/video devices 40 corresponding to the user and location information/data for the one or more audio/video devices 40 to determine if a second audio/video device 40 is in close proximity to the user computing entity 30. In another example device, the signal strength of one or beacon signals received by the user computing entity 30 (e.g., and provide by one or more beacons within the user's home or other location) and profile information/data indicating the location of the audio/video devices 40 within the user's home or other location (e.g., based on the beacon signal strength at the location of the audio/video devices 40) may be used to determine if the user computing entity 30 is in proximity to a second audio/video device 40. In an example embodiment, the process of block 908 is triggered (e.g., performed in response to) the user computing entity 30 determining that the user computing entity 30 (e.g., the user) is moving. For example, an accelerometer may sense that the user computing entity 30 is moving. In another example, the location sensor and/or device of the user computing entity 30 may identify that the user computing entity 30 has changed location and/or is moving. In another example, the signal strength of one or more beacon signals received by the user computing entity 30 may change, indicating the user computing entity 30 is moving.

If, at block 908, it is determined that a second audio/video device 40 is not in close proximity to the user computing entity 30 (and the user), the process returns to block 904. If it is determined that a second audio/video device 40 is in close proximity to the user computing entity 30, it is determined, at block 910, if the second audio/video device 40 has been previously used. For example, the user computing entity 30 (e.g., the client module 35), may determine if the user computing entity 30 (e.g., the client module 35) has communicated with the second audio/video device 40 previously and/or if the user computing entity 30 can communicate with the second audio/video device 40. For example, in an example embodiment, the user computing entity 30 (e.g., via the client module 35) may attempt a handshaking routine and/or other communication routine with the second audio/video device 40 to determine if the user computing entity 30 can communicate with the second audio/video device 40. If the second audio/video device 40 has been registered with the client module 35 (e.g., if the profile information/data corresponding to the user identifies the second audio/video device 40) then block 908 is skipped, in an example embodiment.

If, at block 910, it is determined that the second audio/video device 40 has not been previously used and/or that the user computing entity 30 cannot communicate with the second audio/video device 40, the process continues to block 912. At block 912, the user is asked if the second audio/video device 40 should be used. For example, the user computing entity 30 may provide an audible or non-audible message (e.g., alert, notification, and/or the like) requesting the user provide input (e.g., via the keypad 118 and/or the like) indicating whether the second audio/video device 40 should be used in the location-based switching enabled media event consumption session.

If, at block 910, it is determined that the second audio/video device 40 has been previously used (and/or is registered with the user computing entity 30) and/or can be communicated with by the user computing entity 30, the process continues to block 914. At block 914 it is determined if the second audio/video device 40 is already in use. For example, it may be determined if the second audio/video device 40 is on and currently showing the stream corresponding to the media event or if someone else is using the second audio/video device 40 or if the second audio/video device 40 is not currently in use (e.g., is in standby mode, powered off, and/or the like). For example, if the user was consuming a media event in the living room and walked to the kitchen, somebody else may already be using the television in the kitchen. For example, the user computing entity 30 may communicate with the second audio/video device 40 (e.g., via IR protocol, Bluetooth protocol, local Wi-Fi network, and/or the like) to determine if the second audio/video device 40 is in use.

If, at block 914, it is determined that the second audio/video device 40 is already in use, the process returns to block 904. In an example embodiment, the user computing entity 30 may ask the user if the second audio/video device 40 should be switched to the stream in response to determining that the second audio/video device 40 is already in use. For example, the user computing entity 30 (e.g., the client module 35) may provide a user interface (e.g., via the display 116) requesting user input regarding whether the second audio/video device 40 should be switched to the stream providing the media event being consumed by the user via the first audio/video device 40. If the user provides input (e.g., via the user computing entity 30) indicating that the second audio/video device 40 should be switched to the stream, then the process continues to block 916. Otherwise, the process returns to block 904.

If, at block 914, it is determined that the second audio/video device 40 is not currently in use, the second audio/video device 40 may be turned on and/or activated and tuned to the stream corresponding to the media event that the user has been consuming (e.g., via the first audio/video device 40) at block 916. For example, if the user has been watching a basketball game on channel 37 on a first audio/video device 40 (e.g., a living room television), then the second audio/video device 40 (e.g., the kitchen television) may be turned on and tuned to channel 37 or another channel or stream source providing a stream corresponding to the game being shown on channel 37. For example, the user computing entity 30 may communicate with the second audio/video device 40 to cause the second audio/video device 40 to turn on and/or activate and tune to a channel or other stream source providing a stream corresponding to the media event. For example, the user computing entity 30 may provide (e.g., transmit) a signal and/or communication comprising one or more commands to the second audio/video device 40 via an IR protocol, Bluetooth protocol, a local Wi-Fi network, and/or the like that, upon processing of the signal and/or communication by the second audio/video device 40, causes the second audio/video device 40 to turn on and/or activate and tune to a stream corresponding to the media event.

Figure 10:
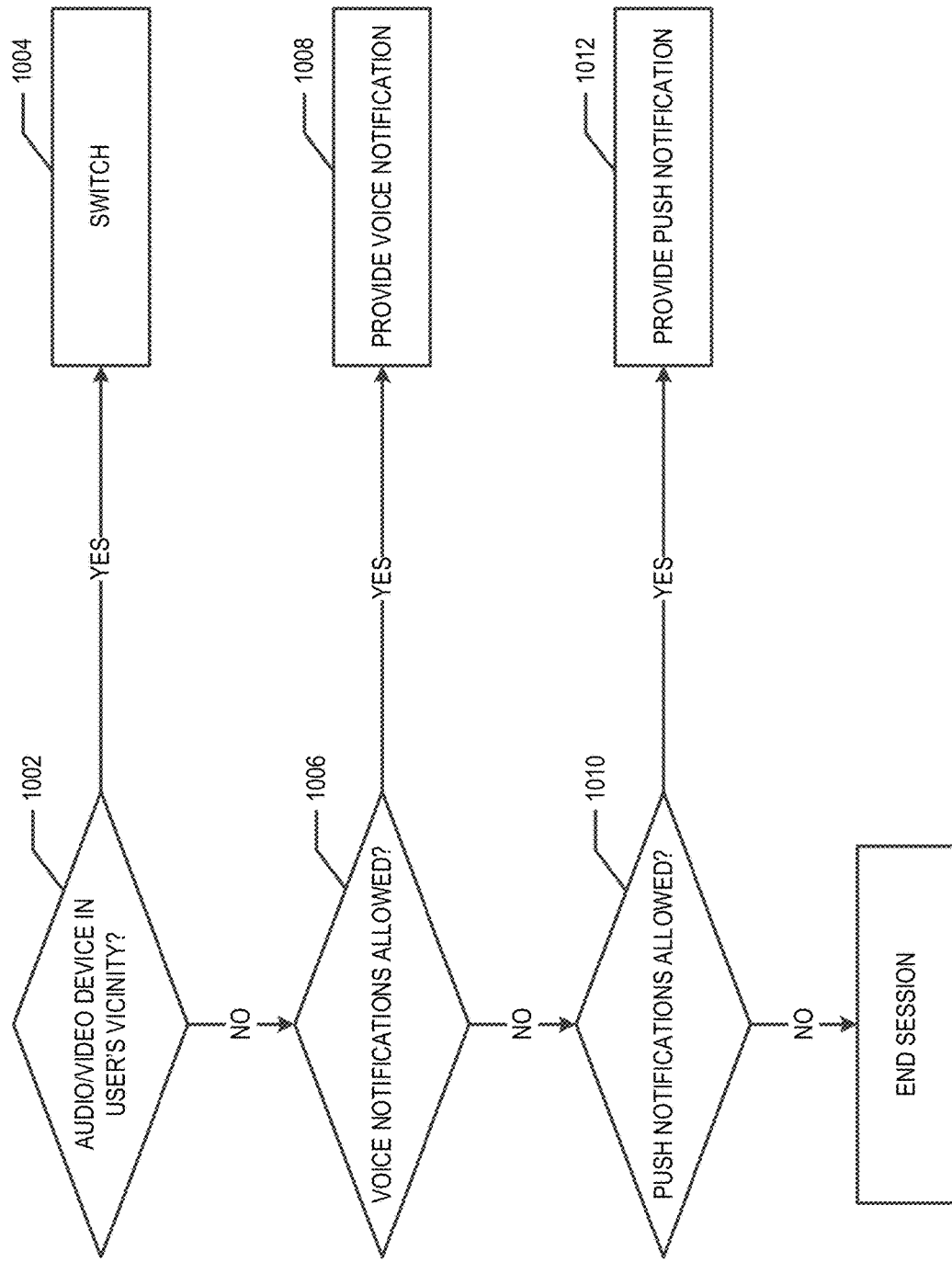

FIG. 10 provides a flowchart illustrating processes and procedures that may be used to automatically turn on and/or activate and tune the second audio/video device 40 to the stream corresponding to the media event that the user is consuming via the first audio/video device 40. For example, a user may be consuming a media event via a first audio/video device 40 and change locations (e.g., rooms within a house/building, from a car to a house, and/or the like) and it may be determined that the second audio/video device 40 is closer to the user's (e.g., the user computing entity's 30) current location/position. In another example, it may be determined that a user's digital calendar (e.g., stored by a calendar application on the user computing entity 30) has an entry indicating that the user would like to consume a particular media event. In another example, the profile information/data (e.g., fan information/data) may be used (e.g., by the provider system 200 and/or the user computing entity 30) to identify a particular media event that the user may wish to consume. Upon the beginning of the broadcasting of the particular media event, it may be determined if the user (e.g., the user computing entity 30) is within a proximity of the second audio/video device 40 such that the second audio/video device 40 may be automatically turned on and/or activated and tuned to an appropriate channel and/or media/stream source such that the user may consume the particular media event. Thus, in various embodiments, the location-based switching enabled media event consuming session may be automatically initiated (e.g., by the user computing entity 30).

As should be understood, the second audio/video device 40 is an audio/video device 40 that is determined (e.g., by the user computing entity 30) to be currently in the vicinity and/or proximity of the user (e.g., the user computing entity 30). For example, the second audio/video device 40 may be the closest registered and/or identifiable audio/video device 40 to the user's current location (e.g., the user computing entity's 30 current location).

In an example embodiment, a process starting at block 908 may be initiated responsive to a particular media event starting that it is expected the user would like to consume (e.g., based on a digital calendar stored on the user computing entity 30 and/or profile information/data, such as fan information/data, corresponding to the user). For example, if it is determined that a particular media event is currently being broadcasted and/or is expected to be being broadcasted via one or more media streams, the location-based switching enabled media event consuming session may initiate, for example, at block 908. In an example embodiment, the location-based switching enabled media event consuming session may initiate, for example, at block 908 responsive to the user computing entity 30 determining that the user computing entity 30 (and presumably the user) is moving. For example, one or more accelerometers, location sensors and/or devices, and/or indoor and/or outdoor location determining processes may indicate that the user computing entity 30 is moving and the process of block 908 may be initiated.

Starting at block 1002, it is determined if the second audio/video device 40 is connected to the user computing entity 30. For example, the user computing entity 30 may access the profile information/data to identify one or more audio/video devices 40 associated with the user. Based on the profile information/data, the user computing entity 30 (e.g., the client module 35) may determine if the user computing entity 30 is in communication with the second audio/video device 40 and/or if the user computing entity 30 can initiate communication with the second audio/video device 40. For example, the user computing entity 30 may attempt to initiate a handshaking routine and/or other communication routine with the second audio/video device 40. If, at block 1002, it is determined that the user computing entity 30 is connected to the second audio/video device 40, the user computing entity 30 may automatically cause the second audio/video device 40 to turn on and/or activate and provide the stream corresponding to the media event the user is/was consuming via the first audio/video device 40 (and/or the user is expected the user would like to consume based on the user's digital calendar and/or profile information/data), at block 1004. For example, the user computing entity 30 may provide a communication to the second audio/video device 40 including a command to turn on and/or activate and switch to a channel or other stream source such that the second audio/video device 40 provides a stream corresponding to the media event. For example, the user computing entity 30 may provide the communication including the command via the network interface 120 and/or transmitter 104 and antenna 112. Responsive to receiving and processing the communication including the command, the second audio/video device 40 may turn on and/or activate and/or tune/switch to the channel and/or other stream source providing a stream corresponding to the media event.

If, at block 1002, it is determined that the user computing entity 30 is not in communication with the second audio/video device 40, the process continues to block 1006. At block 1006, it is determined if voice/audible notifications are allowed. For example, the user computing entity 30 (e.g., the client module 35) may determine if voice/audible notifications are allowed. For example, the profile information/data may be accessed to determine if voice/audible notifications are allowed. In another example, the user computing entity 30 information/data may be accessed to determine if the user computing entity 30 is in a silent, vibrate only, or audible notification mode to determine if voice/audible notifications are allowed. If, at block 1006, it is determined that voice/audible notifications are allowed, an audible activate notification may be provided at block 1008. For example, the user computing entity 30 may provide an audible activate notification indicating that the user should turn on and/or activate the second audio/video device 40 and tune/switch the audio/video device 40 to a particular channel or stream source so the second audio/video device 40 will provide a stream corresponding to the media event. In an example embodiment, an activate notification may comprise information/data identifying the second audio/video device 40 and information/data regarding how the user may access the stream corresponding to the media event for consumption (e.g., the channel number and/or the like).

If, at block 1006, it is determined that voice/audible notifications are not allowed, the process continues to block 1010. At block 1010, it is determined if push notifications are allowed. For example, the user computing entity 30 (e.g., client module 35) may determine if push notifications are allowed. For example, the user computing entity 30 may access the profile information/data and/or user computing entity information/data to determine if push notifications are allowed. If it is determined at block 1006 that push notifications are allowed, the process continues to block 1012 and a non-audible activation notification is provided. For example, a non-audible notification may be displayed on a display 116 of the user computing entity 30. In an example embodiment, an activate notification may comprise information/data identifying the second audio/video device 40 and information/data regarding how the user may access the stream corresponding to the media event for consumption (e.g., the channel number and/or the like).

After automatically causing the second audio/video device 40 to turn on and/or activate and tune to the stream providing the media event, providing an audible switch notification, providing a non-audible switch notification, the process may return to block 904.

Calendar Conflict Resolution

In an example embodiment, the user may turn on the calendar conflict resolution option provided by the client module 35 (e.g., operating on the user computing entity 30 and/or operating on the provider system 200 and accessed through the user computing entity 30). At some point after turning on the calendar conflict resolution option, the user computing entity 30 or provider system 200 (e.g., the client module 35) may identify one or more media events the user may want to consume. For example, the one or more media events the user may want to consume may be identified based on the fan information/data of the profile information/data corresponding to the user and event information/data in the event database 250 corresponding to the media event. The user computing entity 30 and/or provider system 200 (e.g., the client module 35) may access the user's digital calendar. For example, an application program interface (API) may be used to access the user's digital calendar. In an example embodiment, the user computing entity and/or provider system 200 (e.g., the client module 35) may add an event to the user's digital calendar regarding the identified media event. The calendar event may include information/data for accessing the media event (e.g., local television channel, local sports bar expected to be showing the media event, and/or the like). In an example embodiment, the digital calendar may be stored on the user computing entity 30 and/or in a cloud-based calendar accessible via the user computing entity 30. For example, to access calendar information/data corresponding to the user, the client module 35 may execute an API to access calendar information/data stored locally on the user computing entity 30 (e.g., in memory 122, 124) or the client module 35 may execute an API that causes calendar information/data stored locally on the user computing entity 30 to sync with calendar information/data corresponding to the user and stored remotely (e.g., by a Cloud-based system corresponding to a calendar, travel, email, or other application on the user computing entity 30) and then accessing the calendar information/data form the local memory 122, 124. In an example embodiment, the user computing entity 30 and/or provider system 200 (e.g., the client module 35) may determine if any other events on the user's digital calendar overlap with the identified media event. If one or more events on the user's digital calendar overlap with at least a portion of the identified media event, a calendar conflict may be identified. In an example embodiment, the calendar conflict may be resolved by automatically recording the identified media event via an appropriate recording device, notifying the user of the conflict such that the user may set up a recording device to record the identified media event, providing the user with an opportunity request the identified media event be recorded, facilitating the user's ability to consume the media event during the conflicting event, and/or the like.

Figure 11:
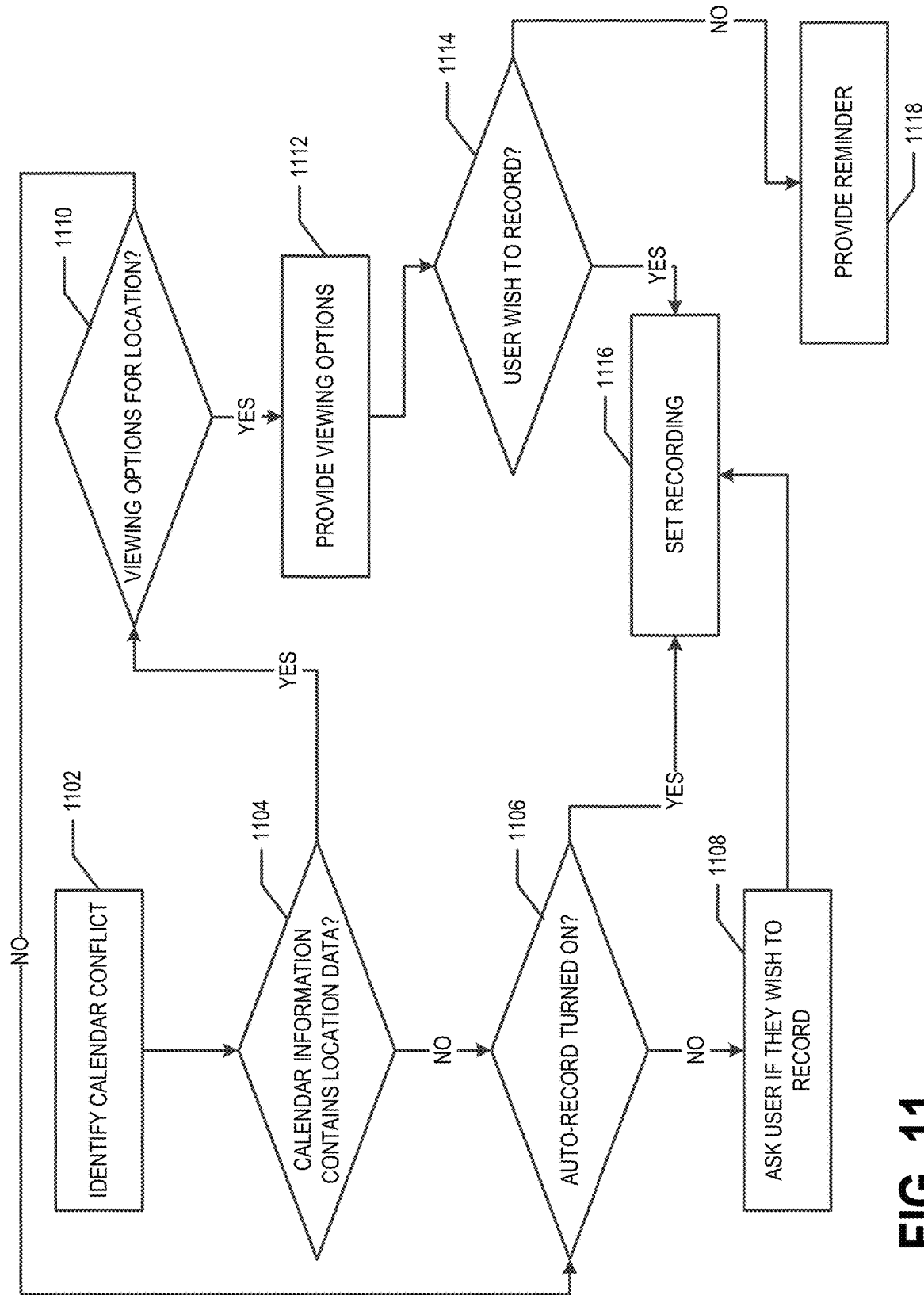

FIG. 11 provides a flowchart illustrating some processes and procedures for resolving a calendar conflict, according to an example embodiment. Starting at block 1102, a calendar conflict may be identified. For example, as described above, a media event that it is expected that the user is interested in consuming may be identified based on fan information/data, the event database 250, and/or the like. For example, if the fan information/data corresponding to the user indicates that the user is an Atlanta Falcons fan and the event database 250 indicates that the Atlanta Falcons have a game Monday Nov. 20, 2017 at 8:30 pm, the it may be determined that it is expected the user will want to consume the Atlanta Falcons game on Monday Nov. 20, 2017 at 8:30 pm. The user's digital calendar may then be accessed and it may be determined that another event on the user's digital calendar overlaps, at least in part, with the identified media event. For example, the user may have scheduled an event on Monday Nov. 20, 2017 from 8-9 pm. In response to identifying that another event on the user's digital calendar overlaps with the identified media event, a calendar conflict may be identified, triggered, and/or determined. For example, the user computing entity 30 and/or the provider system 200 (e.g., the client module 35) may identify, trigger, and/or determine a calendar conflict.

In an example embodiment, a conflict exists between a media event and an instance of calendar information/data (e.g., a calendar event) if the media event and the instance of calendar information/data corresponds to a calendar event that overlaps at least in part with the media event and/or if the instance of calendar information/data indicates that the user will not be home for at least a portion of the media event. For example, if the user has a meeting scheduled until 8:30 pm at a location that is a 20 minute drive from the user's home and the media event (e.g., the Falcons game) starts at 8:30 pm, it may be determined that the meeting conflicts with the media event. In an example embodiment, an instance of calendar information/data may indicate that the user has an outbound flight on Sunday and a return flight on Wednesday. If the identified media event is a football game on Monday night, it is determined that the instance of calendar information/data conflicts with the media event as the instance of calendar information/data indicates that the user will be away from home during the media event. Thus, in an example embodiment, the calendar information/data considered corresponds to a time of the media event even though the calendar information/data may correspond to a calendar event that is at the same time as the media event. For example, the user's outbound light on Sunday and return light on Wednesday corresponds to a time of the Monday night football game, even though the flights themselves to do not overlap with the football game.

At block 1104, it may be determined if the instance of calendar information/data corresponding to the calendar event that overlaps at least in part with the identified media event (also referred to herein as the conflict event) contains any location information/data corresponding to the location of the conflict event. For example, the user computing entity 30 and/or the provider system 200 (e.g., the client module 35) may determine if the instance of calendar information/data corresponding to the conflict event on the user's digital calendar comprises location information/data. If it is determined at block 1104 that the instance of calendar information/data corresponding to the conflict event does not comprise location information/data, the process continues to block 1106. At block 1106, it is determined if the profile information/data corresponding to the user (e.g., the calendar conflict resolution information/data) indicates that the identified media event should be automatically recorded. For example, the user computing entity 30 and/or the provider system 200 may determine if the profile information/data corresponding to the user indicates that the identified media event should be automatically recorded.

If, at block 1106, it is determined that the identified media event should be automatically recorded, the process moves to block 1116. At block 1116, the recording of the media event is automatically set up. For example, the user computing entity 30 and/or provider system 200 (e.g., the client module 35) may automatically set up the recording of the identified media event. For example, the recording may be set on the user's DVR in accordance with the profile information/data corresponding to the user. For example, the user's DVR and/or other recording device associated with the audio/video device 40 may be automatically programmed to record the identified media event. In another example embodiment, the user computing entity 30 may set and/or programmed to record the identified media event. In another example, another recording device may be set and/or programmed to record the identified media event and provide the recording to the user computing entity 30 and/or the audio/video device 40 upon the user's request and/or at a particular time (e.g., a time after the conflicting event is scheduled to be completed). If, at block 1106, it is determined that the user has not set up automatic recording, the user may be asked if he or she would like to record the identified media event at block 1108. For example, the user computing entity 30 may provide an audible or non-audible alert, notification, and/or the like requesting user input indicating whether or not the identified media event should be recorded. In response to receiving user input indicating the identified media event should recorded (e.g., via the user computing entity 30), the recording may be set and/or programmed at block 1116. For example, the user computing entity 30 and/or provider system 200 (e.g., the client module 35) may set up the recording of the identified media event. For example, the recording may be set on the user's DVR and/or other recording device in accordance with the profile information/data corresponding to the user and/or input received from the user (e.g., via the user computing entity 30) in response to the audible and/or non-audible alert, notification and/or the like requesting user input regarding whether the identified media event should be recorded.

If, at block 1104, it is determined that the conflict event does contain location information/data, the process continues to block 1110. At block 1110, it may be determined if there are options for consuming the media event at the location indicated by the conflict event location information/data. For example, the event database 250 and/or another information/data source may be used to identify if one or more streams corresponding to the identified media event are present and/or available at the location corresponding to the conflict event location information/data. For example, if the location information/data indicates that the user will be out of town visiting Austin, Tex., the user computing entity 30 and/or the provider system 200 may determine if a stream will be available in Austin, Tex. for consuming the identified media event. For example, it may be determined if any channels available in Austin, Tex. will be broadcasting the identified media event, if any sports bars or other establishments are expected to be showing the identified media event, and/or the like.

If, at block 1110, it is determined that there are not options for consuming the media event at the location indicated by the conflict event location information/data, the process continues to block 1106. If, at block 1110, it is determined that there are options for consuming the media event at the location indicated by the conflict event location information/data, the process continues to block 1112. At block 1112, the user may be provided with information/data regarding how to access one or more streams corresponding to the identified media event at the location indicated by the conflict event location information/data. For example, the user computing entity 30 may provide the user (e.g., via an audible or non-audible alert, notification, email, text message, tweet, kik, calendar event, and/or the like) with information/data regarding how to access one or more streams providing the identified media event and available at the location indicated by the conflict event location information/data. For example, the user may be provided with one or more local channels that will be providing a stream corresponding to the identified media event, the name and/or location of one or more sports bars or other establishments that are expected to show the media event, and/or the like.

At block 1114, the user may be asked if he or she would like to record the identified media event. For example, the user computing entity 30 may provide an audible or non-audible alert, notification, and/or the like requesting user input indicating whether or not the identified media event should be recorded. In response to receiving user input indicating the identified media event should recorded (e.g., via the user computing entity 30), the recording may be set at block 1116. If, at block 1114, the user provides input indicating the user does not want to record the identified media event, the process may continue to block 1118. At block 1118, a reminder regarding the identified media event and how one or more streams corresponding thereto may be accessed may be provided to the user. For example, the reminder may be provided at a configurable time period before the beginning of the media event. For example, the reminder may be provided one day, one hour, half an hour, and/or the like before the beginning of the media event. For example, the user computing entity 30 may provide the user with an audible and/or non-audible reminder regarding the identified media event and how to access one or more streams corresponding to the identified media event at the location indicated by the conflict event location information/data. In an example embodiment, a plurality of reminders may be provided by the user computing entity 30 regarding the identified media event and how the user may access and/or record one or more streams providing the identified media event. If, at block 1114, the user does not provide input indicating whether or not the identified media event should be recorded, the profile information/data corresponding to the user may be accessed to determine if the user has previously recorded a similar media event, has turned on automatic recording, and/or the like.

In an example embodiment, the conflict information/data and/or conflicting event may be identified based on a scraping of the user's email (e.g., on the user computing entity 30 and/or elsewhere by the client module 35) and/or the location of the user computing entity 30 at a configurable time period prior to the beginning of the identified media event. For example, following from the above example, it is determined that the user is expected to want to consume the Atlanta Falcons game on Nov. 20, 2017. In scraping the user's email, it is determined that the user has a flight to Austin, Tex. on Sunday Nov. 19, 2017 and a return flight to Atlanta, Ga. on Friday Nov. 24, 2017. Therefore, if the user lives in Atlanta, Ga., it is expected that the user will not be home to consume the Atlanta Falcons game on Nov. 20, 2017. Therefore, the user may be provided with information/data regarding how the user may consume the Atlanta Falcons game while they are out of town. For example, the user may be provided with an alert, notification, email, text message, kik, tweet, calendar reminder and/or the like providing a channel and/or other media event stream source available in Austin, Tex. that is providing the Atlanta Falcons game, a URL for a stream of the Atlanta Falcons game, one or more sports bars or other establishments located in or near Austin, Tex. that are expected to be showing the Atlanta Falcons game, and/or the like. Similarly, the user may be asked if they would like to record the media event and/or the media event may be automatically scheduled to be recorded.

In another example embodiment, a media event that it is expected that the user would like to consume is identified (e.g., based on user input identifying the media event or based on fan information/data and/or event information/data, and/or the like). At a configurable amount of time prior to the beginning of the identified media event (e.g., ten minutes, half hour, an hour, and/or the like prior to the beginning of the identified media event), the client module 35 may cause the location sensor and/or device of the user computing entity 30 to determine the location of the user (e.g., the location of the user computing entity 30). Based on the profile information/data corresponding to the user, it may be determined if the user is expected and/or capable of being home at the beginning of the media event. For example, if the user's home address is a two hour drive away from the user's current location, it may be determined that the user is not expected to be home in half an hour when the media event begins. Responsive to determining that the user will likely not be home at the beginning of the media event, the user may be provided with an alert, notification, email, text message, kik, tweet, calendar reminder and/or the like providing a channel and/or other media event stream source available in near the user's current location (e.g., the user computing entity's 30 current location) that is providing the identified media event, a URL for a stream of the identified media event, one or more sports bars or other establishments located near the user's current location that are expected to be showing the identified media event, and/or the like. Similarly, the user may be asked if they would like to record the media event and/or the media event may be automatically scheduled to be recorded.

Thus, in various embodiments, the client module may execute an API to access calendar information/data indicating an expected location of the during a particular point in time and/or to determine whether a user may be busy during a particular point of time such that the user may not be available to consume a media event that it is expected the user would like to consume. For example, in various embodiments, the calendar information/data may be accessed via a digital calendar that is accessible via the user computing entity 30, by scraping a user's email, via a travel application that is accessible via the user computing entity 30, based on a current location of the user as determined by the current location of the user computing entity 30, and/or the like.

Figure 12:
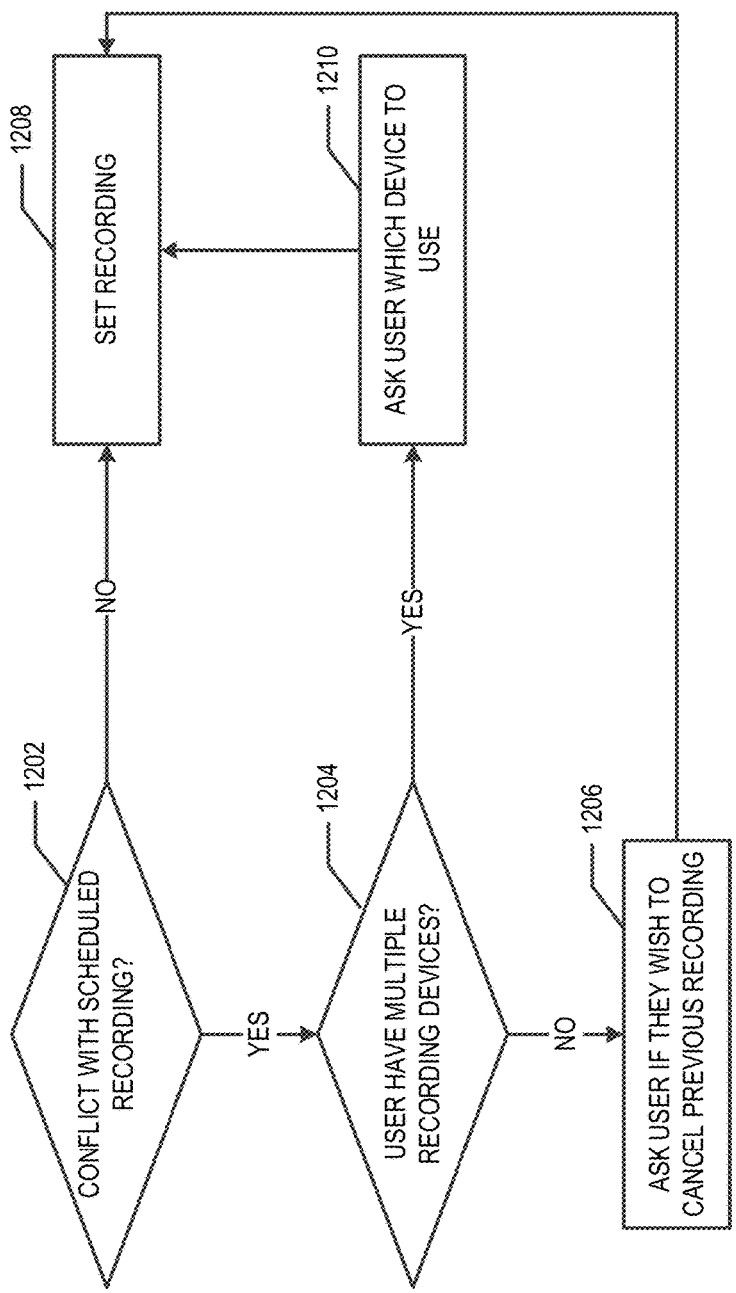

FIG. 12 provides a flowchart illustrating example processes and procedures for setting a recording of a media event, according to example embodiments. Starting at block 1202, it is determined if there is a conflict with a previously scheduled recording. For example, the user computing entity 30, provider system 200, and/or audio/video device 40 may determine if the identified media event overlaps, at least in part, with a previously scheduled recording. If, at block 1202, it is determined that the identified media event does not overlap, even in part, with any previously scheduled recordings, the process continues to block 1208. At block 1208, the recording is scheduled and/or programmed. For example, the user computing entity 30, provider system 200, and/or audio/video device 40 may schedule the recording of the identified media event.

If, at block 1202, it is determined that the identified media event does overlap, at least in part, with a previously scheduled recording, the process continues to block 1204. At block 1204, it is determined if the user has multiple recording devices and/or a recording device that is capable of recording multiple streams at the same time. For example, the user computing entity 30 and/or provider system 200 may access the profile information/data corresponding to the user to determine if the user has multiple recording devices and/or a recording device that is capable of recording multiple streams at the same time. If, at block 1204, it is determined that the user has multiple recording devices and/or a recording device that is capable of recording multiple streams at the same time, the process continues to block 1210. At block 1210, the user may be asked which recording device to use to record the identified media event. For example, the user computing entity 30 may provide an audible or non-audible alert, notification, and/or the like requesting user input indicating which recording device to use to record the identified media event. After receiving user input indicating which recording device to use to record the identified media event (e.g., in response thereto), the recording of the identified media event may be scheduled accordingly at block 1208.

If, at block 1204, it is determined that the user does not have multiple recording devices and/or a recording device that is capable of recording multiple streams at the same time, the process continues to block 1206. At block 1206, the user is asked if he or she wishes to cancel the previous recording. For example, the user computing entity 30 may provide an audible or non-audible alert, notification, and/or the like requesting user input indicating whether the user would like to cancel the previously scheduled recording so that the identified media event may be recorded. After receiving user input indicating that the user would like to cancel the previously scheduled recording so that the identified media event may be recorded (e.g., in response thereto), the recording of the identified media event may be scheduled accordingly at block 1208.

V. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for providing personalized, location-based consumption of a media event, the method comprising:
    identifying, by a user computing entity comprising a processor, a memory, a network interface configured to communicate via at least one network, and a location sensor, a media event that a user is expected to want to consume;
    identifying movement of the user, by the user computing entity using the location sensor, based on a location of the user computing entity changing from a first location in proximity to a first audio/video device to a second location in proximity to a second audio/video device, wherein the first and second audio/video devices are devices configured to provide user perceivable audio and/or video output;
    identifying, by the user computing entity and based at least in part on (a) event information corresponding to the media event and (b) the second location, at least one of (i) a stream providing audio and/or video data corresponding to the media event available at the second location or (ii) the second audio/video device located within close proximity of the user computing entity;
    responsive to determining that the second audio/video device is not in use, providing a communication comprising a command to the second audio/video device, wherein the processing of the communication by the second audio/video device causes the second audio/video device to provide audio and/or video data of the stream; and
    responsive to determining that the second audio/video device is in use, requesting user input, via a user interface of the user computing entity, indicating whether or not to provide the communication to the second audio/video device.

2. The method of claim 1, wherein the media event is identified based on (a) user input identifying the media event, (b) fan data corresponding to the user, (c) the event information, (d) a first stream providing the media event being displayed by the first audio/video device associated with the user, or (e) a combination thereof, wherein the first audio/video device is different from the second audio/video device.

3. The method of claim 1, wherein the communication comprising the command is provided via an infrared protocol, Bluetooth protocol, or local Wi-Fi network.

4. The method of claim 1, wherein the second audio/video device is identified based on the second location of the user computing entity and audio/video device location information stored in association with the profile information corresponding to the user.

5. The method of claim 1, wherein the processing of the communication comprising the command causes the audio/video device to be turned on.

6. The method of claim 1, wherein the processing of the communication comprising the command causes the audio/video device to acquire the stream and provide audio and/or video data of the stream.

7. The method of claim 1, wherein an audio/video device located within close proximity of the user is at least one of (a) the audio/video device located the least distance from a current location determined by the location sensor or (b) the audio/video device located in the same room as the user computing entity as determined based on (a) the current location and (b) the profile information corresponding to the user.

8. An apparatus comprising at least one processor, at least one memory storing computer program code, a network interface configured to communicate via at least one network, and a location sensor, the at least one memory and the computer program code configured to, with the processor, cause the apparatus to at least:
identify a media event that a user is expected to want to consume;
identify movement of the user, using the location sensor, based on a location of the apparatus changing from a first location of the apparatus in proximity to a first audio/video device to a second location of the apparatus in proximity to a second audio/video device, wherein the first and second audio/video devices are devices configured to provide user perceivable audio and/or video output;
identify, based at least in part on (a) event information corresponding to the media event and (b) the second location, at least one of (i) a stream providing audio and/or video data corresponding to the media event available at the second location or (ii) the second audio/video device located within close proximity of the apparatus;
responsive to determining that the second audio/video device is not in use, provide a communication comprising a command to the second audio/video device, wherein the processing of the communication by the second audio/video device causes the second audio/video device to provide audio and/or video data of the stream; and
responsive to determining that the second audio/video device is in use, request user input, via a user interface of the apparatus, indicating whether or not to provide the communication to the second audio/video device.

9. The apparatus of claim 8, wherein the media event is identified based on (a) user input identifying the media event, (b) fan data corresponding to the user, (c) the event information, (d) a first stream providing the media event being displayed by the first audio/video device associated with the user, or (e) a combination thereof, wherein the first audio/video device is different from the second audio/video device.

10. The apparatus of claim 8, wherein the communication comprising the command is provided via an infrared protocol, Bluetooth protocol, or local Wi-Fi network.

11. The apparatus of claim 8, wherein the second audio/video device is identified based on the second location and audio/video device location information stored in association with the profile information corresponding to the user.

12. The apparatus of claim 8, wherein the processing of the communication comprising the command causes the audio/video device to be turned on.

13. The apparatus of claim 8, wherein the processing of the communication comprising the command causes the audio/video device to acquire the stream and provide audio and/or video data of the stream.

14. The apparatus of claim 8, wherein an audio/video device located within close proximity of the user is at least one of (a) the audio/video device located the least distance from a current location determined by the location sensor or (b) the audio/video device located in the same room as the user computing entity as determined based on (a) the current location and (b) the profile information corresponding to the user.

15. A computer program product comprising at least one non-transitory computer-readable storage medium having computer-executable program code instructions stored therein with the computer-executable program code instructions comprising program code instructions, wherein execution of the program code instructions by a processor of an apparatus causes the apparatus to at least:
identify a media event that a user is expected to want to consume via a first audio/video device in proximity of the user;
identify movement of the user, using a location sensor of the apparatus, based on a location of the apparatus changing from a first location of the apparatus in proximity to the first audio/video device to a second location of the apparatus in proximity to a second audio/video device, wherein the first and second audio/video devices are devices configured to provide user perceivable audio and/or video output;
identify, based at least in part on (a) event information corresponding to the media event and (b) the second location, at least one of (i) a stream providing audio and/or video data corresponding to the media event available at the second location or (ii) the second audio/video device located within close proximity of the apparatus;
responsive to determining that the second audio/video device is not in use, provide a communication comprising a command to the second audio/video device, wherein the processing of the communication by the second audio/video device causes the second audio/video device to provide audio and/or video data of the stream; and
responsive to determining that the second audio/video device is in use, requesting user input, via a user interface of the apparatus, indicating whether or not to provide the communication to the second audio/video device.

16. The computer program product of claim 15, wherein the media event is identified based on (a) user input identifying the media event, (b) fan data corresponding to the user, (c) the event information, (d) a first stream providing the media event being displayed by the first audio/video device associated with the user, or (e) a combination thereof, wherein the first audio/video device is different from the second audio/video device.

17. The computer program product of claim 15, wherein the communication comprising the command is provided via an infrared protocol, Bluetooth protocol, or local Wi-Fi network.

18. The computer program product of claim 15, wherein the second audio/video device is identified based on the second location and audio/video device location information stored in association with the profile information corresponding to the user.

19. The computer program product of claim 15, wherein the processing of the communication comprising the command causes the audio/video device to be turned on.

20. The computer program product of claim 15, wherein the processing of the communication comprising the command causes the audio/video device to acquire the stream and provide audio and/or video data of the stream.

* * * * *